US011584375B2

(12) United States Patent
Kato et al.

(10) Patent No.: US 11,584,375 B2
(45) Date of Patent: Feb. 21, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Daichi Kato, Wako (JP); Nozomu Hirosawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 16/819,215

(22) Filed: Mar. 16, 2020

(65) Prior Publication Data

US 2020/0307595 A1 Oct. 1, 2020

(30) Foreign Application Priority Data

Mar. 28, 2019 (JP) .............................. JP2019-064042

(51) Int. Cl.
*B60W 30/18* (2012.01)
*B60W 60/00* (2020.01)
(Continued)

(52) U.S. Cl.
CPC ...... *B60W 30/18163* (2013.01); *B60W 10/04* (2013.01); *B60W 10/20* (2013.01);
(Continued)

(58) Field of Classification Search
CPC ........... B60W 30/18163; B60W 10/04; B60W 10/20; B60W 10/30; B60W 30/12;
(Continued)

(56) References Cited

U.S. PATENT DOCUMENTS

2015/0283998 A1* 10/2015 Lind ..................... B60W 30/17
701/23
2017/0240177 A1* 8/2017 Fujii .................... B60W 50/082
(Continued)

FOREIGN PATENT DOCUMENTS

JP 2008-120288 5/2008
JP 2016-071513 5/2016
(Continued)

OTHER PUBLICATIONS

Japanese Office Action for Japanese Patent Application No. 2019-064042 dated Jun. 1, 2021.

*Primary Examiner* — Nadeem Odeh
(74) *Attorney, Agent, or Firm* — Amin, Turocy & Watson LLP

(57) ABSTRACT

A vehicle control device includes a first inputter, a second inputter, a mode controller configured to, when the first inputter is operated by a user, determine a driving mode of a vehicle as a first mode, and when the second inputter is operated by the user in the first mode, switch the driving mode from the first mode to a second mode, and a driving controller configured to control at least one of a steering and speed of the vehicle, and the driving controller is configured to control a steering and speed of the vehicle and prohibit change of a path of the vehicle when the driving mode is the first mode, and control a steering and speed of the vehicle and change of the path of the vehicle is allowed when the driving mode is the second mode.

6 Claims, 17 Drawing Sheets

(51) Int. Cl.
*B60W 10/20* (2006.01)
*G05D 1/02* (2020.01)
*B60W 10/30* (2006.01)
*B60W 10/04* (2006.01)
*B60W 30/12* (2020.01)
*B60W 50/00* (2006.01)

(52) U.S. Cl.
CPC ............ *B60W 10/30* (2013.01); *B60W 30/12* (2013.01); *B60W 60/0013* (2020.02); *B60W 60/0051* (2020.02); *G05D 1/0223* (2013.01); *B60W 2050/0062* (2013.01); *B60W 2050/0066* (2013.01); *B60W 2050/0067* (2013.01); *B60W 2050/0074* (2013.01); *G05D 2201/0212* (2013.01); *G05D 2201/0213* (2013.01)

(58) Field of Classification Search
CPC ......... B60W 60/0013; B60W 60/0051; B60W 2050/0062; B60W 2050/0066; B60W 2050/0067; B60W 2050/0074; B60W 2554/802; B60W 2554/804; B60W 2556/50; B60W 30/143; B60W 30/16; G05D 1/0223; G05D 2201/0212; G05D 2201/0213; G05D 1/0061
USPC ..................................................... 701/23, 26
See application file for complete search history.

(56) References Cited

U.S. PATENT DOCUMENTS

| | | | |
|---|---|---|---|
| 2018/0118223 A1* | 5/2018 | Mori | B60W 50/14 |
| 2018/0126986 A1* | 5/2018 | Kim | B60W 30/146 |
| 2018/0154939 A1* | 6/2018 | Aoki | B62D 15/025 |
| 2018/0239352 A1* | 8/2018 | Wang | B60W 30/182 |
| 2018/0297611 A1* | 10/2018 | Fujisawa | G01C 21/365 |

FOREIGN PATENT DOCUMENTS

| | | |
|---|---|---|
| JP | 2017-138899 | 8/2017 |
| JP | 2018-203098 | 12/2018 |

* cited by examiner

FIG. 11

```
PLEASE, OPERATE SECOND SWITCH
WHEN AUTO LANE CHANGING (ALC)
IS PERFORMED
```

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2019-064042, filed Mar. 28, 2019, the entire content of which is incorporated herein by reference.

BACKGROUND

Field of the Invention

The present invention relates to a vehicle control device, a vehicle control method, and a storage medium.

Description of Related Art

In recent years, studies have been conducted on automatically controlling driving of a vehicle (hereinafter referred to as automated driving). In connection with this, a technology in which a default lane in which a vehicle generally travels during automated driving is determined according to the intention of a driver, and the vehicle is caused to automatically change lanes to the default lane is known (for example, refer to Japanese Unexamined Patent Application, First Publication No. 2016-71513).

SUMMARY

Even in automated driving, the occupant may not want to change lanes by moving to another lane, and it is desired to perform appropriate automated driving for each occupant. However, in the related art, it is not possible to perform appropriate automated driving for each occupant.

According to aspects of the present invention, there are provided a vehicle control device, a vehicle control method, and a storage medium through which it is possible to perform appropriate automated driving for each occupant.

The vehicle control device, the vehicle control method, and the storage medium according to the present invention have the following configurations.

According to Aspect (1) of the present invention, there is provided a vehicle control device, including: a first inputter that is operable by a user; a second inputter that is operable by the user; a mode controller configured to, when the first inputter is operated, determine a driving mode of a vehicle as a first mode, and when the second inputter is operated in the first mode, switch the driving mode from the first mode to a second mode; and a driving controller configured to control at least one of a steering and speed of the vehicle, wherein the driving controller controls a steering and speed of the vehicle and prohibits change of a path of the vehicle when the driving mode is the first mode, and controls a steering and speed of the vehicle and change of the path of the vehicle is allowed when the driving mode is the second mode.

According to Aspect (2), the vehicle control device according to Aspect (1) further includes a third inputter that is operable by the user; and a determiner configured to determine whether it is necessary to change the path of the vehicle according to the surrounding situation of the vehicle, wherein the driving controller allows change of the path of the vehicle when the driving mode is the second mode and an instruction to change the path of the vehicle is input to the third inputter or when the determiner determines that it is necessary to change the path of the vehicle.

According to Aspect (3), in the vehicle control device according to Aspect (2), wherein the second mode includes a third mode and a fourth mode, wherein, when a first predetermined condition is satisfied after the second inputter is operated in the first mode, the mode controller is configured to determine the driving mode as the third mode, and until the first predetermined condition is satisfied from when the second inputter is operated in the first mode, the mode controller is configured to determine the driving mode as the fourth mode, wherein the driving controller prohibits change of the path of the vehicle when the driving mode is the third mode and the instruction is input to the third inputter, when the determiner determines that it is necessary to change the path, or when change of the path of the vehicle is allowed and the driving mode is the fourth mode.

According to Aspect (4), in the vehicle control device according to any one of Aspects (1) to (3), the second inputter receives an input operation of the user when the driving mode is a mode in which a duty to grip at least a steering handler is not imposed on the user, and does not receive an input operation of the user when the driving mode is a mode in which the duty is imposed on the user.

According to Aspect (5), the vehicle control device according to Aspect (3) further includes an outputter configured to output information; and an output controller that is configured to cause the outputter to output information indicating that control to change the path of the vehicle is in a restricted state when the driving mode is the fourth mode.

According to Aspect (6), in the vehicle control device according to any one of Aspects (1) to (5), wherein the mode controller is configured to switch the driving mode from the second mode to another mode when a second predetermined condition is satisfied in the second mode, and wherein the driving controller prohibits change of the path of the vehicle when the driving mode is switched from the second mode to another mode.

According to Aspect (7), in the vehicle control device according to Aspect (6), wherein the second predetermined condition includes at least one of a condition that the second inputter is operated, a condition that a direction indicator is operated, and a condition that the vehicle exits a section in which automated driving is allowed.

According to another Aspect (8) of the present invention, there is provided a vehicle control method causing a computer mounted in a vehicle including a first inputter that is operable by a user and a second inputter that is operable by the user to perform: determining a driving mode of a vehicle as a first mode when the first inputter is operated; switching the driving mode from the first mode to a second mode when the second inputter is operated in the first mode; controlling at least one of a steering and speed of the vehicle; controlling a steering and speed of the vehicle and prohibiting change of the path of the vehicle when the driving mode is the first mode; and controlling a steering and speed of the vehicle and allowing change of the path of the vehicle when the driving mode is the second mode.

According to another Aspect (9) of the present invention, there is provided a computer readable non-transitory storage medium storing a program causing a computer mounted in a vehicle including a first inputter that is operable by a user and a second inputter that is operable by the user to execute: determining a driving mode of a vehicle as a first mode when the first inputter is operated; switching the driving mode from the first mode to a second mode when the second inputter is operated in the first mode; controlling at least one of a steering and speed of the vehicle; controlling a steering and speed of the vehicle and prohibiting change of the path of the vehicle when the driving mode is the first mode; and controlling a steering and speed of the vehicle and allowing change of the path of the vehicle when the driving mode is the second mode.

According to any one of Aspects (1) to (9), it is possible to perform appropriate automated driving for each occupant.

BRIEF DESCRIPTION OF THE DRAWINGS

FIG. 11 is a diagram showing an example of a screen of the display device on which prompting information is displayed.

DESCRIPTION OF EMBODIMENTS

A vehicle control device, a vehicle control method, and a storage medium according to embodiments of the present invention will be described below with reference to the drawings. In the embodiments, an example in which, when driving assistance of a vehicle is performed, recognition results for around the vehicle are displayed on a display device will be described. The driving assistance refers to controlling at least one of the steering and speed of the vehicle, for example, as in an adaptive cruise control system (ACC) and a lane keeping assistance system (LKAS), or controlling both of them. In particular, controlling the steering and speed of the vehicle is also called automated driving. In the following, a case in which left-hand traffic regulations are applied will be described. However, when right-hand traffic regulations are applied, left and right may be switched.

[Overall Configuration]

Figure 1:
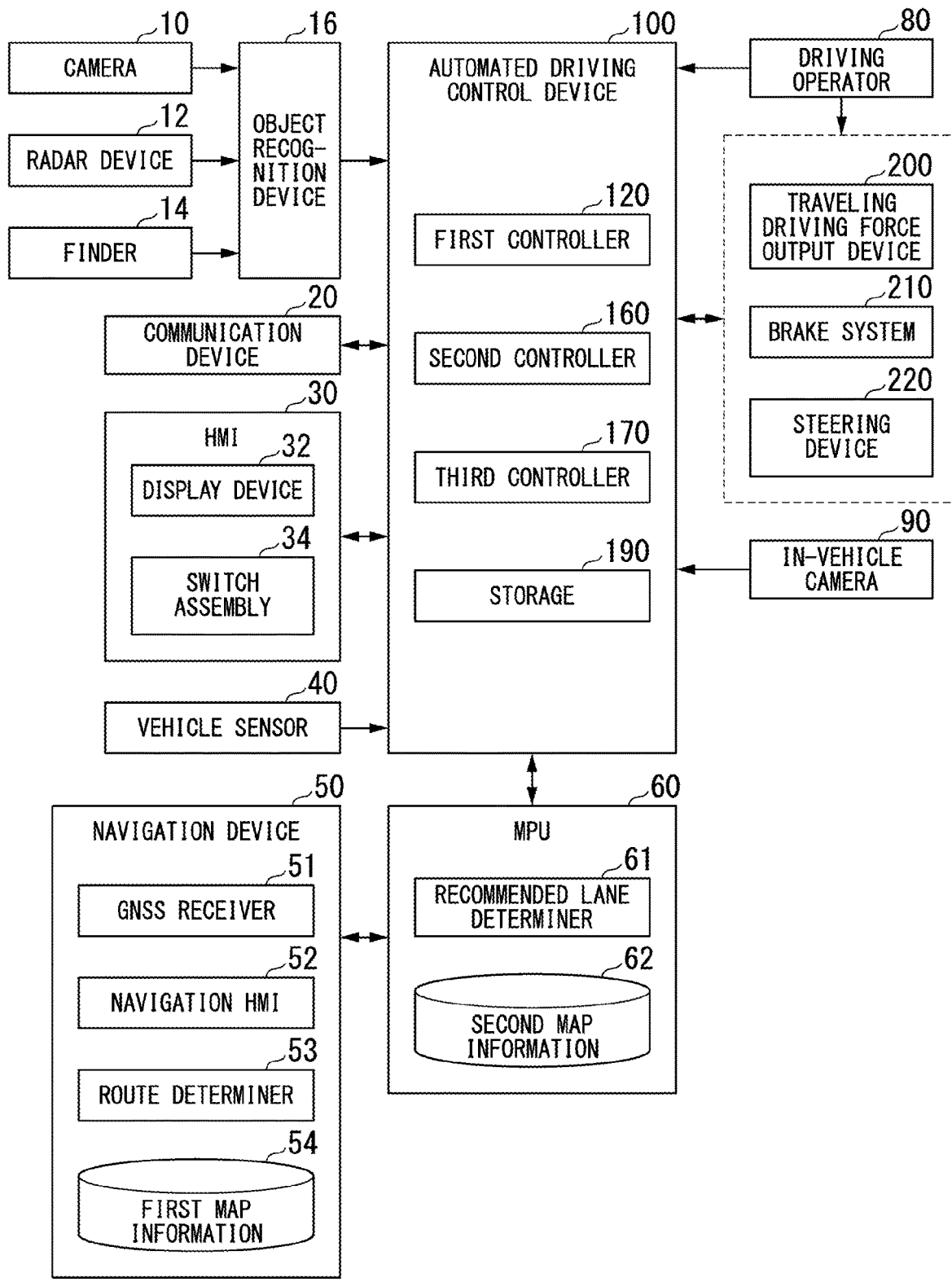
FIG. 1 is a configuration diagram of a vehicle system using a vehicle control device according to an embodiment.

FIG. 1 is a configuration diagram of a vehicle system 1 using a vehicle control device according to an embodiment. A vehicle on which the vehicle system 1 is mounted (hereinafter referred to as a host vehicle M) is, for example, a vehicle with two wheels, three wheels, four wheels, or the like. A driving source of the vehicle includes an internal combustion engine such as a diesel engine and a gasoline engine, an electric motor, or a combination thereof. The electric motor operates using power generated by a power generator connected to the internal combustion engine or power discharged from a secondary battery or a fuel cell.

For example, the vehicle system 1 includes a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an in-vehicle camera 90, an automated driving control device 100, a traveling driving force output device 200, a brake system 210, and a steering device 220. These devices and instruments are connected to each other via a multiplex communication line such as a controller area network (CAN) communication line, a serial communication line, a wireless communication network, or the like. The configuration shown in FIG. 1 is only an example, and some of the components may be omitted or other components may be additionally added.

The camera 10 is, for example, a digital camera using a solid-state imaging device such as a charge coupled device (CCD) and a complementary metal oxide semiconductor (CMOS). The camera 10 is attached to an arbitrary part of the host vehicle M. When the camera 10 captures an image in front of the vehicle, it is attached to an upper part of the front windshield, a rear surface of the rearview mirror, or the like. For example, the camera 10 images periodically and repeatedly the surroundings of the host vehicle M. The camera 10 may be a stereo camera.

The radar device 12 emits radio waves such as millimeter waves to the vicinity of the host vehicle M and detects radio waves (reflected waves) reflected at an object and detects at least a position (a distance and a direction) of the object. The radar device 12 is attached to an arbitrary part of the host vehicle M. The radar device 12 may detect a position and speed of the object according to a frequency modulated continuous wave (FM-CW) method.

The finder 14 is a sensor using light detection and ranging (LIDAR). The finder 14 emits light to the vicinity of the host vehicle M and measures scattered light. The finder 14 detects a distance to the object based on a time from when light is emitted until light is received. The light which is emitted is, for example, a pulsed laser beam. The finder 14 is attached to an arbitrary part of the host vehicle M.

The object recognition device 16 performs sensor fusion processing on detection results obtained by some or all of the camera 10, the radar device 12, and the finder 14, and recognizes a position, type, speed and the like of the object. The object recognition device 16 outputs the recognition results to the automated driving control device 100. The object recognition device 16 may output the detection results of the camera 10, the radar device 12, and the finder 14 to the automated driving control device 100 without change. The object recognition device 16 may be omitted from the vehicle system 1.

The communication device 20 communicates with other vehicles present around the host vehicle M using, for example, a cellular network, a Wi-Fi network, Bluetooth (registered trademark, hereinafter omitted), or dedicated short range communication (DSRC), or communicates with various sensor devices through a wireless base station.

The HMI 30 presents various types of information to an occupant in the host vehicle M and receives an operation input by the occupant. For example, the HMI 30 includes a display device 32 and a switch assembly 34. For example, the display device 32 includes a first display 32A and a second display 32B.

The switch assembly 34 includes, for example, a first switch 34A and a second switch 34B. The HMI 30 may further include a speaker, a buzzer, a touch panel, and the like. The display device 32 or the speaker is an example of an "outputter," the first switch 34A is an example of a "first inputter," and the second switch 34B is an example of a "second inputter."

Figure 2:
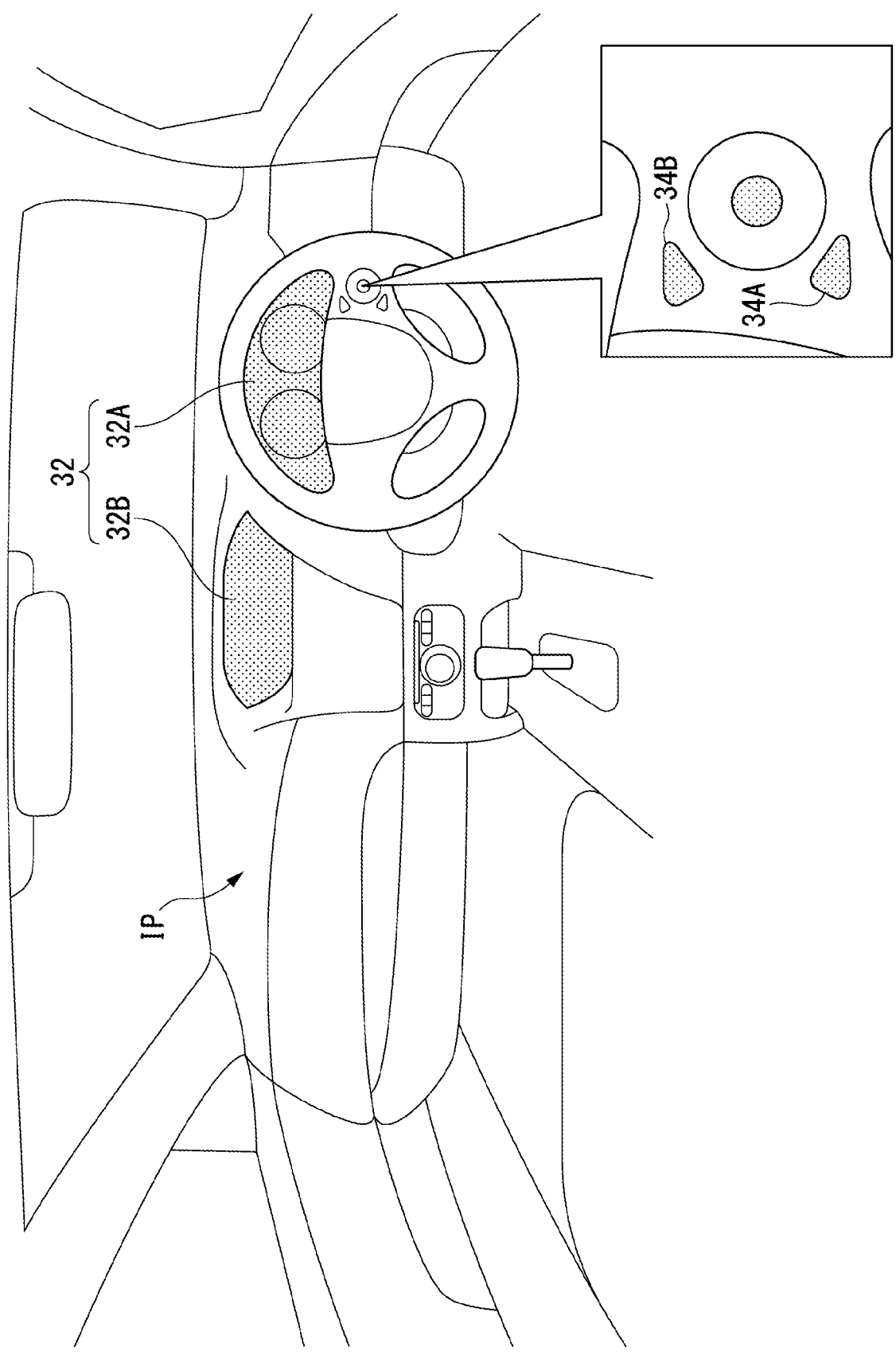
FIG. 2 is a diagram schematically showing a status inside a host vehicle.

FIG. 2 is a diagram schematically showing the status inside the host vehicle M. For example, the first display 32A is provided near the front of a driver's seat (seat closest to the steering wheel) in an instrument panel IP and installed at a position at which the occupant can see from a gap by the steering wheel or through the steering wheel. The first display 32A is, for example, a liquid crystal display (LCD) or an organic electro luminescence (EL) display device. Information necessary for travelling of the host vehicle M during manual driving or during driving assistance is displayed as an image on the first display 32A. The information necessary for travelling of the host vehicle M during manual driving is, for example, a speed of the host vehicle M, an engine rotational speed, a remaining fuel amount, a radiator water temperature, a traveling distance, and other information. The information necessary for driving the host vehicle M during driving assistance is information, such as for example, a future trajectory of the host vehicle M (a target trajectory to be described below), whether lane change is to be performed, a destination lane of a lane change, the recognized lane (lane marking), and other vehicles. The information necessary for driving the host vehicle M during driving assistance may include a part or all of the information necessary for driving the host vehicle M during manual driving.

For example, the second display 32B is installed near the center of the instrument panel IP. Like the first display 32A, the second display 32B is, for example, an LCD or an organic EL display device. For example, the second display 32B displays navigation results of the navigation device 50 as an image. The second display 32B may display a TV program, reproduce a DVD, or display content such as a downloaded movie.

For example, the switch assembly 34 is attached to the steering wheel. The first switch 34A and the second switch 34B are physically independent switches. For example, when the first switch 34A is operated, the driving mode of the host vehicle M is switched from a manual driving mode to a driving assistance mode. When the second switch 34B is operated, the driving mode of the host vehicle M is switched from a driving assistance mode to an automated driving mode having a higher degree of control.

The manual driving mode is a mode in which the speed and steering of the host vehicle M are controlled according to the driving operation of the occupant. The driving assistance mode is a mode in which one of the speed and steering of the host vehicle M is controlled independently of driving operations of the occupant. For example, in the driving assistance mode, controls such as ACC and LKAS are allowed, but control such as ALC by which a lane is changed to change the path of the host vehicle M is prohibited. In the driving assistance mode, LKAS is restricted while ACC is performed, and ACC is restricted while LKAS is performed. That is, in the driving assistance mode, the steering control and the speed control are sequentially processed.

The automated driving mode is a mode in which both the speed and steering of the host vehicle M are controlled independently of driving operations of the occupant. For example, in the automated driving mode, control such as auto lane changing (ALC) is allowed in addition to the above ACC and LKAS. Hereinafter, the automated driving mode in which ALC is allowed will be specifically described as an "automated lane change mode." The automated driving mode including the automated lane change mode includes a first automated driving mode and a second automated driving mode. In these automated driving modes, a duty (also called tasks) according to the degree of control is imposed on the occupant in the host vehicle M. Other automated driving modes in which ALC is not performed are examples of a "first mode." The automated lane change mode is an example of a "second mode."

In the first automated driving mode, for example, a first duty and a second duty are imposed on the occupant. The first duty is a duty to monitor the surroundings of (particularly, in front of) the host vehicle M, and the second duty is a duty to grip a steering handler such as a steering wheel. "Grip" means to grasp with a hand or touch with a hand. On the other hand, in the second automated driving mode, for example, the first duty is imposed and the second duty is not imposed on the occupant. In the above driving assistance mode, the first duty and the second duty are imposed as in the first automated driving mode. In each driving mode, when the occupant does not perform his or her duty, the driving mode of the host vehicle M transitions to a driving mode having a lower degree of control than the driving mode that is currently being performed.

In the manual driving mode, when the occupant operates the first switch 34A and turns the first switch 34A on, the driving mode of the host vehicle M transitions from the manual driving mode to the driving assistance mode. Then, when the host vehicle M in the driving assistance mode enters a restricted section in which automated driving is permitted (hereinafter referred to as an automated driving permitted section), the driving mode of the host vehicle M transitions from the driving assistance mode to the second automated driving mode (the automated driving mode in which the first duty is imposed). The automated driving permitted section is, for example, a road section in which the host vehicle M can recognize a host lane or a relative position of the host vehicle M with respect to the host lane can be recognized. Specifically, the automated driving permitted section is a highway in which relative positional relationships between lane markings of lanes are defined in second map information 62 to be described below.

When the host vehicle M has already entered the automated driving permitted section before the occupant operates the first switch 34A, that is, when the host vehicle M in the manual driving mode has entered the automated driving permitted section, the driving mode of the host vehicle M does not transition to the second automated driving mode and the manual driving mode is maintained. When the host vehicle M in the manual driving mode is traveling in the automated driving permitted section, if the occupant operates the first switch 34A, the driving mode of the host vehicle M transitions to the second automated driving mode at a timing at which the first switch 34A is operated.

In the second automated driving mode, when the occupant operates the second switch 34B and turns the second switch 34B on, the driving mode of the host vehicle M transitions from the second automated driving mode to the automated lane change mode. In the automated lane change mode, the first duty is imposed as in the second automated driving mode before transition.

When the second switch 34B is in the manual driving mode, the driving assistance mode, or the first automated driving mode, that is, in the driving mode in which the second duty is imposed, operations are disabled (the operations of the occupant are not received), or when the second switch 34B is at least in the second automated driving mode in which the second duty is not imposed, operations are enabled (the operations of the occupant are received).

The above automated driving mode may include a third automated driving mode in which a degree of duty imposed on the occupant is smaller. For example, in the third automated driving mode, neither the first duty nor the second duty is imposed on the occupant.

The description will return to FIG. 1. The vehicle sensors 40 include a vehicle speed sensor that detects a speed of the host vehicle M, an acceleration sensor that detects an acceleration, a yaw rate sensor that detects an angular velocity around a vertical axis, a direction sensor that detects a direction of the host vehicle M, and the like.

For example, the navigation device 50 includes a global navigation satellite system (GNSS) receiver 51, a navigation HMI 52, and a route determiner 53. The navigation device 50 maintains first map information 54 in a storage device such as a hard disk drive (HDD) or a flash memory.

The GNSS receiver 51 identifies a position of the host vehicle M based on signals received from GNSS satellites. The position of the host vehicle M may be identified or supplemented by an inertial navigation system (INS) using an output of the vehicle sensor 40.

The navigation HMI 52 includes a display device, a speaker, a touch panel, a key, and the like. A part or all of the navigation HMI 52 may be shared with the above HMI 30.

For example, the route determiner 53 determines a route to a destination input by the occupant (hereinafter referred to as a route on the map) from the position (or any input position) of the host vehicle M identified by the GNSS receiver 51, using the navigation HMI 52 with reference to the first map information 54. The first map information 54 is, for example, information in which a road pattern is expressed with links indicating roads and nodes connected by links. The first map information 54 may include a road curvature, point of interest (POI) information, and the like. The route on the map is output to the MPU 60.

The navigation device 50 may perform route guidance using the navigation HMI 52 based on the route on the map. The navigation device 50 may be realized by, for example, a function of a terminal device such as a smartphone and a tablet terminal that the occupant holds. The navigation device 50 may transmit the current position and destination to a navigation server through the communication device 20 and acquire the same route as the route on the map from the navigation server.

The MPU 60 includes, for example, a recommended lane determiner 61, and maintains the second map information 62 in a storage device such as an HDD and a flash memory. The recommended lane determiner 61 divides the route on the map provided from the navigation device 50 into a plurality of blocks (for example, divides every 100 [m] with respect to the travelling direction of the vehicle), and determines a recommended lane for each block with reference to the second map information 62. The recommended lane determiner 61 determines in which lane numbered from the left to travel. When there is a branching point on the route on the map, the recommended lane determiner 61 determines a recommended lane so that the host vehicle M can travel along a reasonable route to a branch destination.

The second map information 62 is map information wither higher accuracy than the first map information 54. The second map information 62 may include, for example, information on the center of the lane, information on the boundary of the lane, information on the type of the lane, and the like. The second map information 62 may include road information, traffic regulation information, address information (address and zip code), facility information, phone number information, and the like. The second map information 62 may be updated at any time according to communication by the communication device 20 with other devices.

The driving operators 80 include, for example, an accelerator pedal, a brake pedal, a shift lever, a steering wheel, a direction indicator, a joystick, an operation lever, and other handlers. A sensor that detects an operation amount or whether or not an operation has been performed is attached to the driving operators 80, and the detection result is output to the automated driving control device 100, or some or all of the traveling driving force output device 200, the brake system 210, and the steering device 220. The steering wheel is an example of a "steering handler." When a joystick or an operation lever is used as a handler for adjusting the travelling direction of the host vehicle M, the joystick or operation lever is another example of the "steering handler."

For example, the sensor attached to the steering wheel (hereinafter referred to as a steering sensor) detects a weak current that is generated when the occupant touches the steering wheel. The steering sensor may detect a steering torque that is generated around a rotation axis (shaft) of the steering wheel. When the steering sensor detects a current or steering torque, it outputs a signal indicating the detection result to the automated driving control device 100.

The in-vehicle camera 90 is a camera that images the inside of a cabin of the host vehicle M. The in-vehicle camera 90 is, for example, a digital camera using a solid-state imaging device such as a CCD and a CMOS. When the in-vehicle camera 90 images the inside of the cabin of the host vehicle M, it outputs image data to the automated driving control device 100.

The automated driving control device 100 includes, for example, a first controller 120, a second controller 160, a third controller 170, and a storage 190. The first controller 120, the second controller 160, and the third controller 170 are realized, for example, when a processor such as a central processing unit (CPU) and a graphics processing unit (GPU) executes a program (software). Some or all of these components may be realized by hardware (circuit unit; including a circuitry) such as a large scale integration (LSI), an application specific integrated circuit (ASIC), and a field-programmable gate array (FPGA) or may be realized in cooperation of software and hardware. The program may be stored in the storage 190 of the automated driving control device 100 in advance or may be stored in a removable storage medium such as a DVD and a CD-ROM, and may be installed in the storage 190 when the storage medium is mounted in a drive device.

The storage 190 is realized by, for example, an HDD, a flash memory, an electrically erasable programmable read only memory (EEPROM), a read only memory (ROM), or a random access memory (RAM). The storage 190 stores, for example, a program that is read and executed by a processor.

Figure 3:
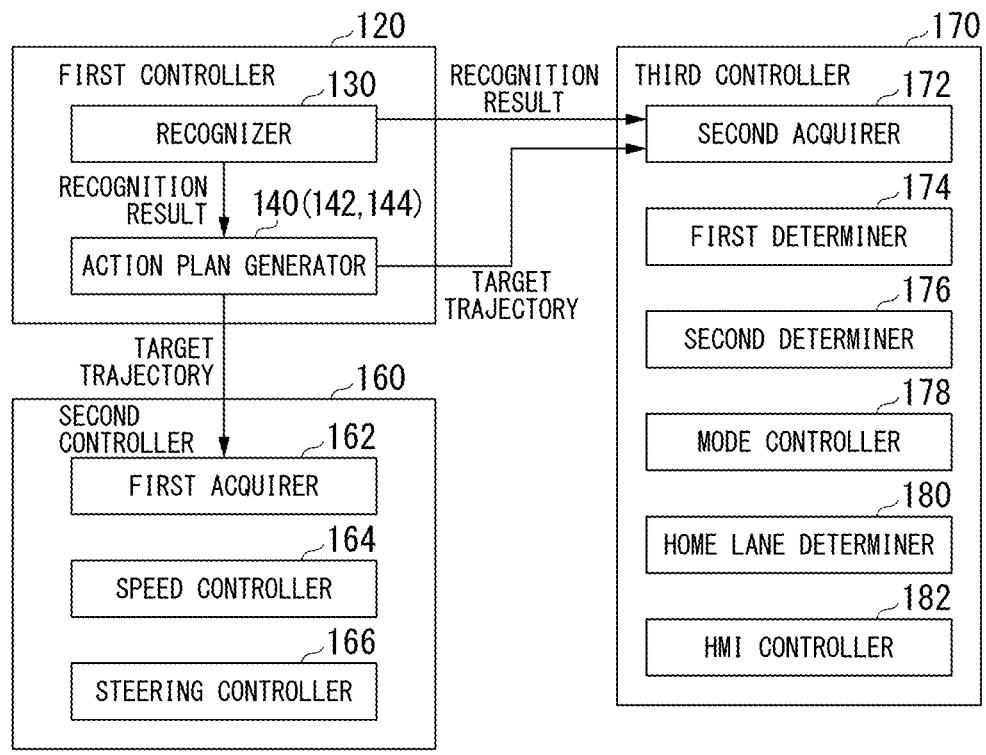
FIG. 3 is a functional configuration diagram of a first controller, a second controller, and a third controller.

FIG. 3 is a functional configuration diagram of the first controller 120, the second controller 160, and the third controller 170. The first controller 120 includes, for example, a recognizer 130 and an action plan generator 140. For example, the first controller 120 realizes a function based on artificial intelligence (AI) and a function based on a model provided in advance in parallel. For example, a function of "recognizing an intersection" may be realized according to recognition of an intersection using deep learning and the like and recognition based on conditions provided in advance (pattern-matchable signals, road lanes and the like) executed in parallel, and scoring and comprehensively evaluating them. Thereby, the reliability of the automated driving is secured.

The recognizer 130 recognizes an object present around the host vehicle M based on information input from the camera 10, the radar device 12, and the finder 14 through the object recognition device 16. Examples of objects recognized by the recognizer 130 include bicycles, motorcycles, four-wheeled vehicles, pedestrians, road signs, road lanes, lane markings, utility poles, guardrails, and fallen objects. The recognizer 130 recognizes the status of the object such as the position, speed, and acceleration. For example, the position of the object is recognized as a position on relative coordinates (that is, a relative position with respect to the host vehicle M) using a representative point (center of gravity, center of the drive shaft, or the like) of the host vehicle M as the origin and is used for control. The position of the object may be represented by a representative point such as the center of gravity or a corner of the object or may be represented by a representative region.

The "status" of the object may include the acceleration or jerk of the object or "action status" (for example, whether it is changing or about to change lanes).

The recognizer 130 recognizes that a road section in which the host vehicle M is traveling is an automated driving permitted section with reference to the second map information 62. For example, the recognizer 130 compares a pattern of road lane lines (for example, an arrangement of solid lines and broken lines) obtained from the second map information 62 with a pattern of road lane lines around the host vehicle M recognized from the image captured by the camera 10, and thus recognizes the automated driving permitted section. In addition, the recognizer 130 recognizes a host lane in which the host vehicle M is traveling and an adjacent lane adjacent to the host lane based on the comparison of patterns of road lane lines.

The recognizer 130 may recognize the host lane and the adjacent lane and recognize the automated driving permitted section by recognizing roadway boundaries (road boundaries) including road lane lines, shoulders, curbstones, median strips, and guardrails without limitation to road lane lines. In this recognition, the position of the host vehicle M acquired from the navigation device 50 and the processing result by INS may be taken into consideration. The recognizer 130 recognizes temporary stop lines, obstacles, red lights, tollgates, and other road events.

When the host lane is recognized, the recognizer 130 recognizes the relative position and direction of the host vehicle M with respect to the host lane. For example, the recognizer 130 may recognize the deviation of a reference point on the host vehicle M with respect to the center of the lane and an angle formed with respect to the line connected to the center of the lane in the travelling direction of the host vehicle M as the relative position and direction of the host vehicle M with respect to the host lane. Alternatively, the recognizer 130 may recognize the position of the reference point on the host vehicle M with respect to any side end (road lane line or road boundary) of the host lane as the relative position of the host vehicle M with respect to the host lane.

The action plan generator 140 includes, for example, an event determiner 142 and a target trajectory generator 144. When the host vehicle M is under automated driving on the route in which the recommended lane is determined, the event determiner 142 determines the traveling mode of the automated driving. Hereinafter, information defining the traveling mode of the automated driving will be described as an event.

Examples of events include a constant-speed traveling event, a following traveling event, a lane change event, a branching event, a merging event, and a takeover event. The constant-speed traveling event is an event in which the host vehicle M is caused to travel in the same lane at a certain speed. The following traveling event is an event in which the host vehicle M is caused to follow another vehicle (hereinafter referred to as a preceding vehicle mA) which is within a predetermined distance (for example, within 100 [m]) in front of the host vehicle M and closest to the host vehicle M. "Following" may be, for example, a traveling mode in which an inter-vehicle distance (relative distance) between the host vehicle M and the preceding vehicle mA is kept constant or a traveling mode in which, in addition to keeping an inter-vehicle distance between the host vehicle M and the preceding vehicle mA constant, the host vehicle M is caused to travel in the center of the host lane. The lane change event is an event in which the host vehicle M is caused to change lanes from the host lane to the adjacent lane. The branching event is an event in which the host vehicle M is caused to branch to destination lane at a branching point of the road. The merging event is an event in which the host vehicle M is caused to merge into the main line at a merging point. The takeover event is an event in which automated driving is caused to end and the driving is caused to be switched to manual driving. Examples of events include a passing event and an avoidance event. The passing event is an event in which the host vehicle M is caused to change lanes to an adjacent lane temporarily, pass the preceding vehicle mA in the adjacent lane and then change lanes again to the original lane. The avoidance event is an event in which the host vehicle M is caused to perform at least one of braking and steering in order to avoid obstacles existing in front of the host vehicle M.

For example, the event determiner 142 may change an event already determined for the current section to another event and determine a new event for the current section according to the surrounding situation recognized by the recognizer 130 when the host vehicle M is traveling.

The event determiner 142 may change an event already determined for the current section to another event and determine a new event for the current section according to the operation of the occupant on in-vehicle unit. For example, when the occupant operates the direction indicator, the event determiner 142 may change an event already determined for the current section to the lane change event and determine a new lane change event for the current section.

For example, when the occupant operates a lever (also referred to as a stoke or a switch) of the direction indicator and instructs the vehicle to change lanes to an adjacent lane on the left side, the event determiner 142 determines a lane change event in which the host vehicle M is caused to change lanes to an adjacent lane on the left side when viewed from the host vehicle M. For example, when the occupant operates a lever of the direction indicator and instructs the vehicle to change lanes to an adjacent lane on the right side, the event determiner 142 determines a lane change event in which the host vehicle M is caused to change lanes to an adjacent lane on the right side when viewed from the host vehicle M. Operating the lever of the direction indicator to instruct a lane change is also called a one-touch function. The lane change instruction may be performed, in addition to or instead of operating the lever of the direction indicator, by operating the steering wheel, by inputting sound to a microphone, or by operating other switches or buttons. The direction indicator, the steering wheel, the microphone, and other switches or buttons are examples of a "third inputter."

In principle, the target trajectory generator 144 generates a future target trajectory in which the host vehicle M travels on the recommended lane determined by the recommended lane determiner 61, and additionally, in order to respond the surrounding situation when the host vehicle M is traveling on the recommended lane, the host vehicle M is caused to automatically (independently of operations of the driver) travel in the traveling mode defined by the event. The target trajectory includes, for example, a position element that determines the future position of the host vehicle M and a speed element that determines the future speed of the host vehicle M.

For example, the target trajectory generator 144 determines a plurality of points (trajectory points) which the host vehicle M will reach sequentially as the position element of the target trajectory. The trajectory point is a point which the host vehicle M will reach for each of predetermined traveling distances (for example, about every several [m]). The predetermined traveling distance can be calculated by, for example, a distance along the route when the vehicle travels along the route.

The target trajectory generator 144 determines a target speed and a target acceleration for each of predetermined sampling times (for example, about every several fractions of a [sec]) as a speed element of the target trajectory. The trajectory point may be a position that the host vehicle M will reach at a sampling time for each of predetermined sampling times. In this case, the target speed and target acceleration are determined according to intervals between the sampling times and the trajectory points. The target trajectory generator 144 outputs information indicating the generated target trajectory to the second controller 160.

Figure 4:
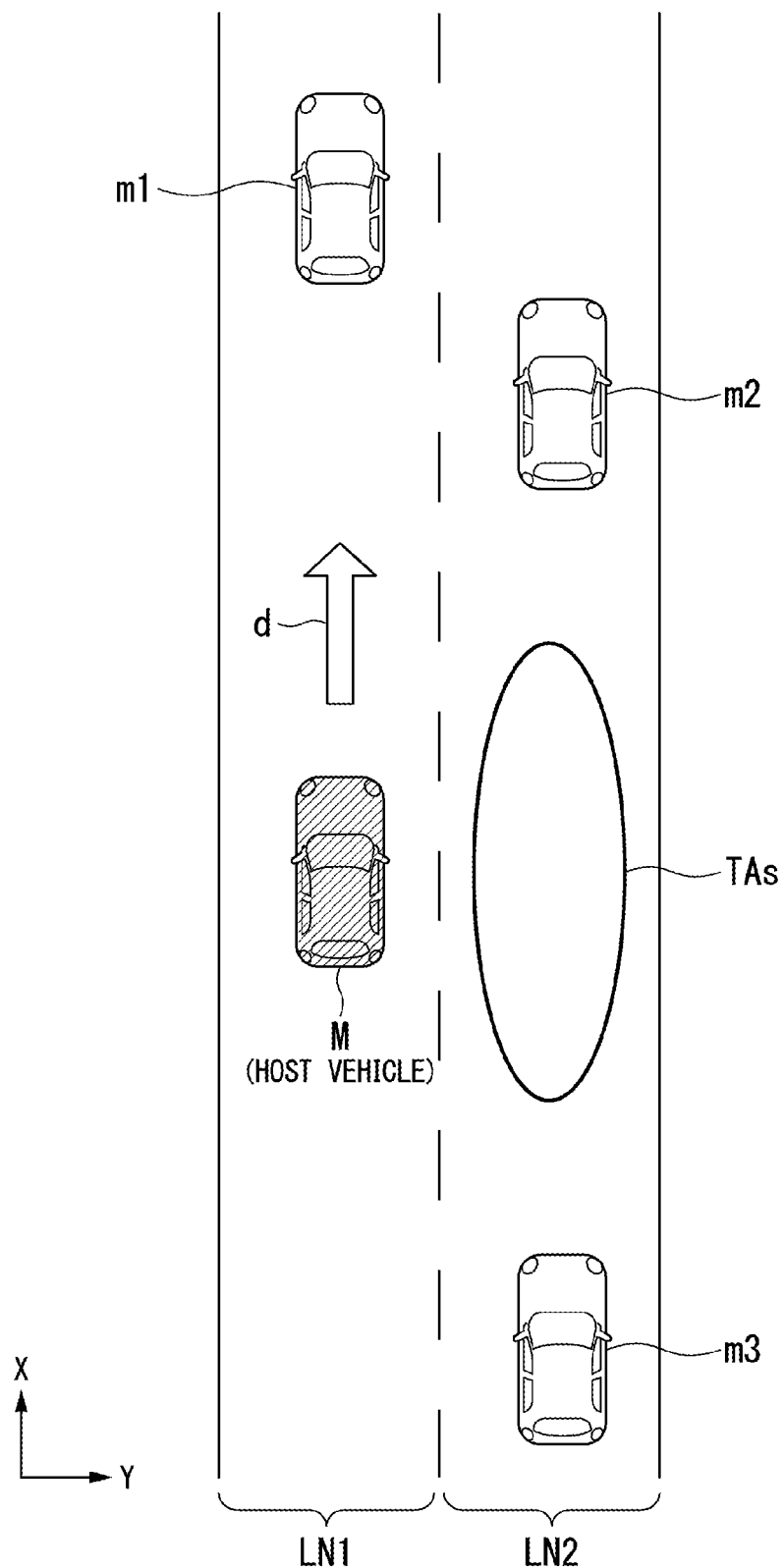
FIG. 4 is a diagram explaining a scenario in which the host vehicle is caused to change lanes.
Figure 5:
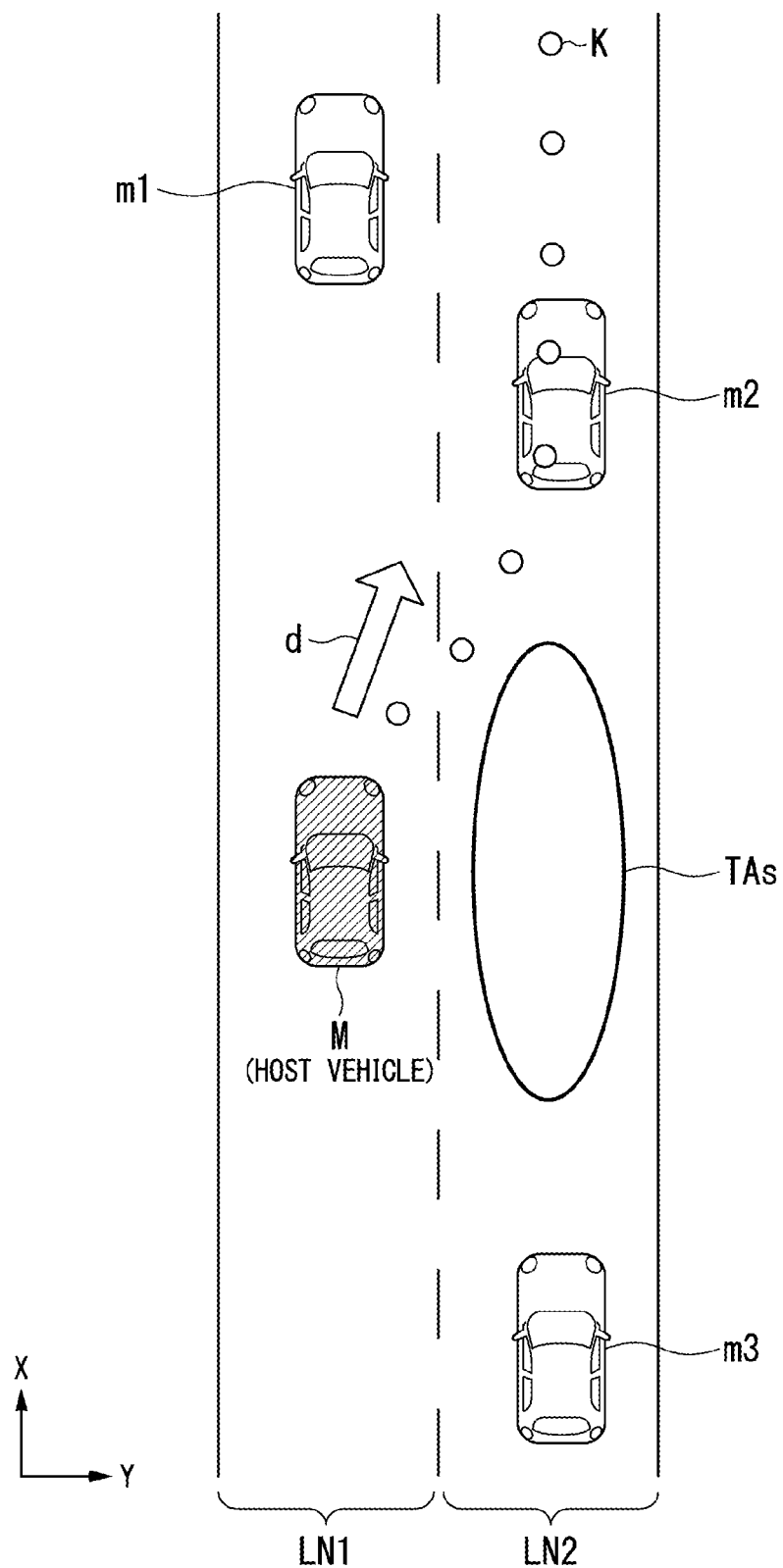
FIG. 5 is a diagram explaining a scenario in which the host vehicle is caused to change lanes.
Figure 6:
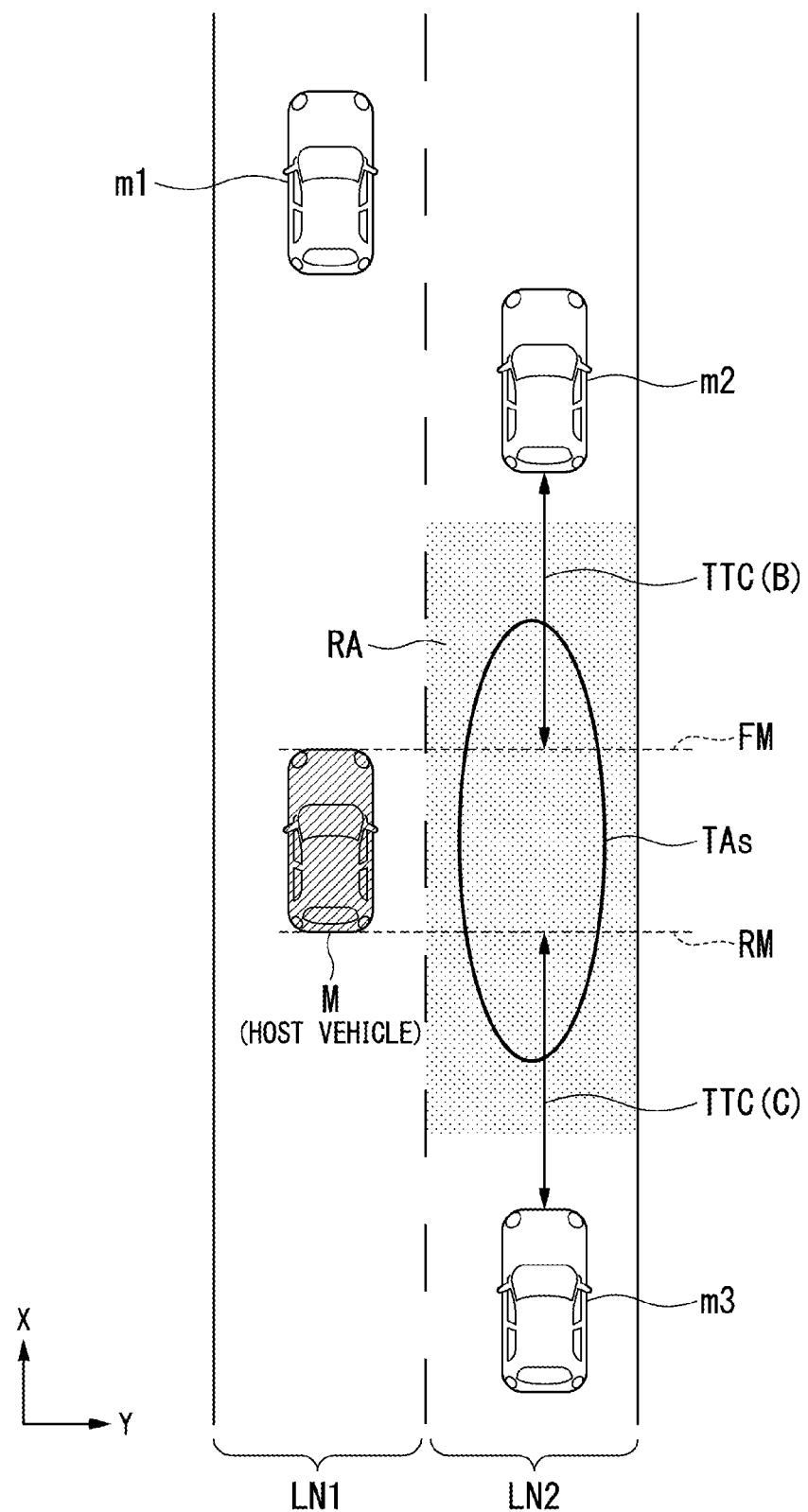
FIG. 6 is a diagram explaining a scenario in which the host vehicle is caused to change lanes.

Hereinafter, as an example, a scenario in which the host vehicle M travels in a section in which the lane change event is planned, that is, a scenario in which the host vehicle M is caused to change lanes, will be described. FIG. 4 to FIG. 6 are diagrams explaining scenarios in which the host vehicle M is caused to change lanes. In the drawings, LN1 indicates a host lane, and LN2 indicates an adjacent lane adjacent to the host lane. X indicates an extending direction of the road or a travelling direction of the host vehicle M, and Y indicates a vehicle width direction orthogonal to the X direction.

When the event in the current section is a lane change event, the target trajectory generator 144 selects two other vehicles from among a plurality of other vehicles that are traveling in the adjacent lane LN2 and sets a lane change target position TAs between the two selected other vehicles. The lane change target position TAs is a position of a target lane change destination and is a relative position between the host vehicle M and other vehicles m2 and m3. In the shown example, since the other vehicles m2 and m3 are traveling on the adjacent lane, the target trajectory generator 144 sets the lane change target position TAs between the other vehicles m2 and m3. When only one other vehicle is in the adjacent lane LN2, the target trajectory generator 144 may set the lane change target position TAs to any position in front of or behind the other vehicle. When there are no other vehicles in the adjacent lane LN2, the target trajectory generator 144 may set the lane change target position TAs to any position on the adjacent lane LN2. Hereinafter, another vehicle (in the shown example, m2) that travels immediately before the lane change target position TAs in the adjacent lane will be referred to as a forward reference vehicle mB and another vehicle (in the shown example, m3) that travels immediately after the lane change target position TAs in the adjacent lane will be referred to as a rearward reference vehicle mC.

When the lane change target position TAs is set, the target trajectory generator 144 generates a plurality of target trajectory candidates for causing the host vehicle M to change lanes. In the example in FIG. 5, the target trajectory generator 144 assumes that each of the other vehicle m1 as the preceding vehicle mA, the other vehicle m2 as the forward reference vehicle mB, and the other vehicle m3 as the rearward reference vehicle mC travels with a predetermined speed model and generates a plurality of target trajectory candidates based on speed models of these three vehicles and the speed of the host vehicle M so that the host vehicle M is at the lane change target position TAs between the forward reference vehicle mB and the rearward reference vehicle mC at a certain time in the future without interfering with the preceding vehicle mA.

For example, the target trajectory generator 144 smoothly connects the position of the forward reference vehicle mB at a certain time in the future from the current position of the host vehicle M, the center of the lane of the lane change destination, and the lane change end point using a polynomial curve such as a spline curve, and a predetermined number of trajectory points K are arranged at equal intervals or unequal intervals on this curve. In this case, the target trajectory generator 144 generates a plurality of target trajectory candidates such that at least one of the trajectory points K is arranged within the lane change target position TAs.

Then, the target trajectory generator 144 selects an optimal target trajectory from among the generated plurality of target trajectory candidates. The optimal target trajectory is, for example, a target trajectory in which a yaw rate predicted to be generated when the host vehicle M is caused to travel based on the target trajectory is less than a threshold value and the speed of the host vehicle M is within a predetermined speed range. The threshold value of the yaw rate is set to, for example, a yaw rate at which there is no overload (the acceleration in the vehicle width direction becomes a threshold value or more) on the occupant when the lanes change. The predetermined speed range is set to, for example, a speed range of about 70 to 110 [km/h].

When the target trajectory generator 144 sets the lane change target position TAs and generates a target trajectory for causing the host vehicle M to change lanes to the lane change target position TAs, it is determined whether the lane can be changed to the lane change target position TAs (that is between the forward reference vehicle mB and the rearward reference vehicle mC).

For example, the target trajectory generator 144 sets a prohibited region RA in which the presence of another vehicle is prohibited in the adjacent lane LN2, and when a part of another vehicle is not present in the prohibited region RA, and each of the time to collision (TTC) of the host vehicle M and the forward reference vehicle mB and the rearward reference vehicle mC is larger than a threshold value, it is determined that it is possible to change lanes. The determination condition is an example when the lane change target position TAs is set to the side of the host vehicle M.

As exemplified in FIG. 6, for example, the target trajectory generator 144 projects the host vehicle M onto the lane LN2 of the lane change destination and sets the prohibited region RA having a certain margin distance in front and behind thereof. The prohibited region RA is set as a region that extends from one end of the lane LN2 in the lateral direction (Y direction) to the other end.

When there are no other vehicles in the prohibited region RA, the target trajectory generator 144 sets, for example, a virtual extension line FM and extension line RM at the front end and rear end of the host vehicle M on the side of the lane LN2 of the lane change destination. The target trajectory generator 144 calculates a time to collision TTC(B) between the extension line FM and the forward reference vehicle mB and a time to collision TTC(C) between the extension line RM and the rearward reference vehicle mC. The time to collision TTC(B) is a time derived by dividing a distance between the extension line FM and the forward reference vehicle mB by a relative speed of the host vehicle M and the forward reference vehicle mB (the other vehicle m2 in the shown example). The time to collision TTC(C) is a time derived by dividing a distance between the extension line RM and the rearward reference vehicle mC (the other vehicle m3 in the shown example) by a relative speed of the host vehicle M and the rearward reference vehicle mC. When the time to collision TTC(B) is larger than the threshold value Th(B) and the time to collision TTC(C) is larger than the threshold value Th(C), the target trajectory generator 144 determines that it is possible to change lanes. The threshold values Th(B) and Th(C) may be the same value or different values.

When it is determined that it is not possible to change lanes, the target trajectory generator 144 selects two other new vehicles from among a plurality of other vehicles that are traveling in the adjacent lane LN2, and resets the lane change target position TAs between the two newly selected other vehicles. One of the two newly selected other vehicles may be a previously selected other vehicle.

The target trajectory generator 144 repeats setting of the lane change target position TAs until it is determined that it is possible to change lanes. In this case, the target trajectory generator 144 may generate a target trajectory for causing the host vehicle M to wait in the host lane LN1 or generate a target trajectory for causing the host vehicle M to decelerate or accelerate so that it is moved to the side of the lane change target position TAs in the host lane LN1.

When it is determined that it is possible to change lanes, the target trajectory generator 144 outputs information indicating the generated target trajectory to the second controller 160.

The second controller 160 controls the traveling driving force output device 200, the brake system 210, and the steering device 220 so that the host vehicle M passes along the target trajectory generated by the target trajectory generator 144 according to a scheduled time.

The second controller 160 includes, for example, a first acquirer 162, a speed controller 164, and a steering controller 166. A combination of the event determiner 142, the target trajectory generator 144, and the second controller 160 is an example of a "driving controller."

The first acquirer 162 acquires information on the target trajectory (trajectory point) from the target trajectory generator 144 and stores it in a memory of the storage 190.

The speed controller 164 controls one or both of the traveling driving force output device 200 and the brake system 210 based on the speed element (for example, a target speed and a target acceleration) included in the target trajectory stored in the memory.

The steering controller 166 controls the steering device 220 according to the position element (for example, a curvature indicating the degree of curve of the target trajectory) included in the target trajectory stored in the memory.

The processing of the speed controller 164 and the steering controller 166 is realized by, for example, a combination of feedforward control and feedback control. As an example, the steering controller 166 executes a combination of feedforward control according to the curvature of the road in front of the host vehicle M and feedback control based on the deviation from the target trajectory.

The traveling driving force output device 200 outputs a traveling driving force (torque) with which vehicle travels to drive wheels. The traveling driving force output device 200 includes, for example, a combination of an internal combustion engine, an electric motor, a transmission and the like, and a power electronic controller (ECU) that controls them. The power ECU controls the above configuration according to information input from the second controller 160 or information input from the driving operator 80.

The brake system 210 includes, for example, a brake caliper, a cylinder that transmits a hydraulic pressure to a brake caliper, an electric motor that generates a hydraulic pressure in the cylinder, and a brake ECU. The brake ECU controls the electric motor according to information input from the second controller 160 or information input from the driving operator 80, and outputs a brake torque according to the braking operation to wheels. The brake system 210 may include a mechanism that transmits a hydraulic pressure generated when the brake pedal included in the driving operator 80 is operated to the cylinder via a master cylinder as a backup. The brake system 210 is not limited to the above-described configuration, and may be an electronically controlled hydraulic brake system that controls an actuator according to information input from the second controller 160 and transmits a hydraulic pressure of the master cylinder to the cylinder.

The steering device 220 includes, for example, a steering wheel ECU and an electric motor. The electric motor applies a force to, for example, a rack and pinion mechanism, and changes the direction of steered wheels. The steering wheel ECU drives the electric motor according to information input from the second controller 160 or information input from the driving operator 80, and changes the direction of the steered wheels.

The third controller 170 includes, for example, a second acquirer 172, a first determiner 174, a second determiner 176, a mode controller 178, a home lane determiner 180, and an HMI controller 182. The HMI controller 182 is an example of an "output controller."

The second acquirer 172 acquires information on the result recognized by the recognizer 130 and acquires information on the target trajectory generated by the target trajectory generator 144.

The first determiner 174 determines whether the occupant is grasping the steering handler such as the steering wheel with his or her hands or is touches the steering handler with his or her hands based on the detection results of the steering sensor in the first automated driving mode in which at least the second duty is imposed. That is, the first determiner 174 determines whether the occupant is performing the second duty. For example, when the current value or steering torque detected by the steering sensor is equal to or larger than a threshold value, the first determiner 174 determines that the occupant is grasping the steering handler with his or her hands or is touching the steering handler with his or her hands. Hereinafter, a state in which the occupant is grasping the steering handler with his or her hands or is touching the steering handler with his or her hands, that is, a state in which the second duty is performed, will be referred to as "hands-on," otherwise, it will be referred to as "hands-off."

The second determiner 176 analyzes an image generated by the in-vehicle camera 90 in the first automated driving mode or second automated driving mode in which the first duty is imposed, and detects a direction of a gaze or a direction of the face of the occupant in the driver's seat. The second determiner 176 determines whether the occupant in the driver's seat is monitoring the vicinity of the host vehicle M based on the detected direction of the gaze or face. That is, the second determiner 176 determines whether the occupant is performing the first duty. For example, when the occupant is looking outside the vehicle through the front windshield, that is, when the occupant is looking forward, the second determiner 176 determines that the occupant is monitoring the vicinity of the host vehicle M. For example, when the occupant is looking at the second display 32B provided in the vehicle, that is, when the occupant is not looking forward, the second determiner 176 determines that the occupant is not monitoring the vicinity of the host vehicle M. Hereinafter, a state in which the occupant is monitoring the vicinity of the host vehicle M, that is, a state in which the first duty is being performed, will be referred to as "eyes-on," and otherwise, a state will be referred to as "eyes-off."

The mode controller 178 controls the driving mode of the host vehicle M based on the section in which the host vehicle M is traveling. For example, when the host vehicle M has entered the automated driving permitted section, if the first switch 34A has already been operated, the mode controller 178 switches the driving mode to the second automated driving mode. When the host vehicle M exits the automated driving permitted section, the mode controller 178 switches the driving mode from the automated driving mode to the driving assistance mode or the automated driving mode.

The mode controller 178 controls the driving mode of the host vehicle M based on the operation input to the switch assembly 34. For example, when the first switch 34A is operated in the manual driving mode, the mode controller 178 switches the driving mode from the manual driving mode to the driving assistance mode. When the host vehicle M has entered the automated driving permitted section and the driving mode is switched to the second automated driving mode, the mode controller 178 enables operation input to the second switch 34B. For example, in the second automated driving mode, when the second switch 34B in which input operation is enabled is operated by a user, the mode controller 178 switches the driving mode to the automated lane change mode.

The mode controller 178 controls the driving mode of the host vehicle M based on the determination results of the first determiner 174 and the second determiner 176. For example, in the first automated driving mode, when hands-off is determined by the first determiner 174, the mode controller 178 determines that the occupant is not performing the second duty, and when eyes-off is determined by the second determiner 176, the mode controller 178 determines that the occupant is not performing the first duty. In this case, for example, the mode controller 178 switches the driving mode from the first automated driving mode to the driving assistance mode. For example, in the second automated driving mode, when eyes-off is determined by the second determiner 176, the mode controller 178 determines that the occupant is not performing the first duty. In this case, for example, the mode controller 178 switches the driving mode from the second automated driving mode to the driving assistance mode.

The mode controller 178 may control the driving mode based on a detection signal input from the driving operator 80. For example, in the automated driving mode or the driving assistance mode, when the occupant operates the steering wheel, the accelerator pedal, or the brake pedal with an operation amount exceeding a threshold value, the mode controller 178 may switch the driving mode to the manual driving mode.

The home lane determiner 180 determines a lane recognized as a host lane by the recognizer 130 when the driving mode is switched to the automated driving mode among one or a plurality of lanes recognized by the recognizer 130 as a home lane. The home lane is an example of a "reference lane."

The home lane is a lane in which it is determined to be reasonable for the automated driving control device 100 to cause the host vehicle M to travel or a lane in which the host vehicle M should travel as instructed by the occupant operating a direction indicator or the like. For example, when there is a branching point or merging point midway along the route to the destination and it is necessary to pass a preceding vehicle, the lane in which the host vehicle M should travel dynamically changes. Therefore, the home lane determiner 180 flexibly changes the home lane determined when the driving mode is switched to the automated driving mode according to the surrounding situation of the host vehicle M and an instruction of the occupant.

The HMI controller 182 controls the HMI 30 based on information acquired by the second acquirer 172 and causes the HMI 30 to output various types of information. For example, the HMI controller 182 causes the display device 32 (particularly, the first display 32A) of the HMI 30 to display a first layer image depicting the road on which the host lane, the adjacent lane and the like are recognized by the recognizer 130 and a second layer image depicting the home lane determined by the home lane determiner 180 which are superimposed. In addition, the HMI controller 182 may cause the display device 32 to display a third layer image depicting other vehicles such as the preceding vehicle mA, the forward reference vehicle mB, and the rearward reference vehicle mC recognized by the recognizer 130, a fourth layer image depicting the target trajectory generated by the action plan generator 140, and the like, which are superimposed on the first layer image or the second layer image.

Figure 7:
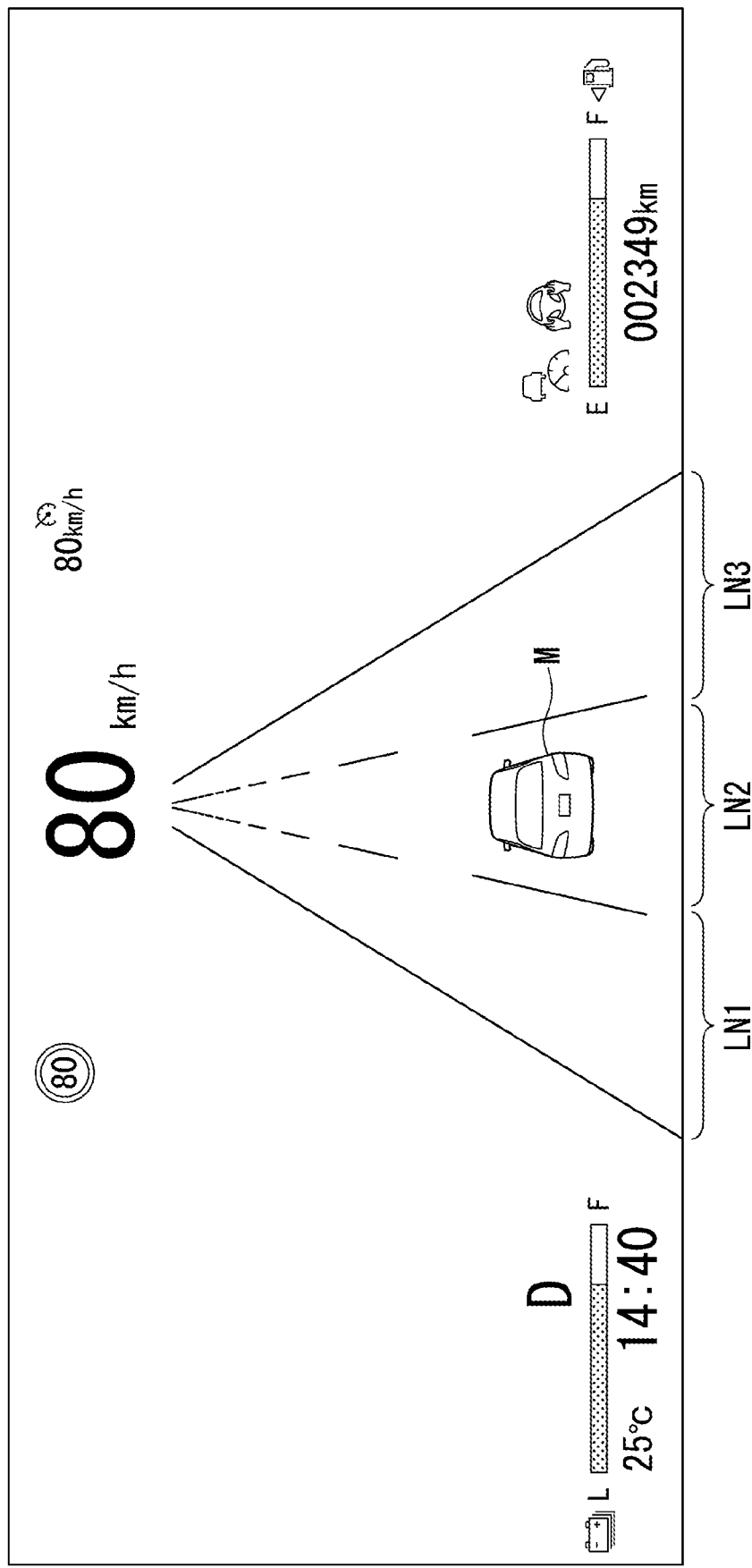
FIG. 7 is a diagram showing an example of a screen of a display device when a driving mode is a manual driving mode.

FIG. 7 is a diagram showing an example of a screen of the display device 32 when the driving mode is the manual driving mode. In the drawing, LN1 to LN3 indicate lanes recognized by the recognizer 130. In the example in the drawing, the HMI controller 182 causes a first layer image of a road including the three lanes LN1 to LN3 to be displayed on the screen of the display device 32.

Figure 8:
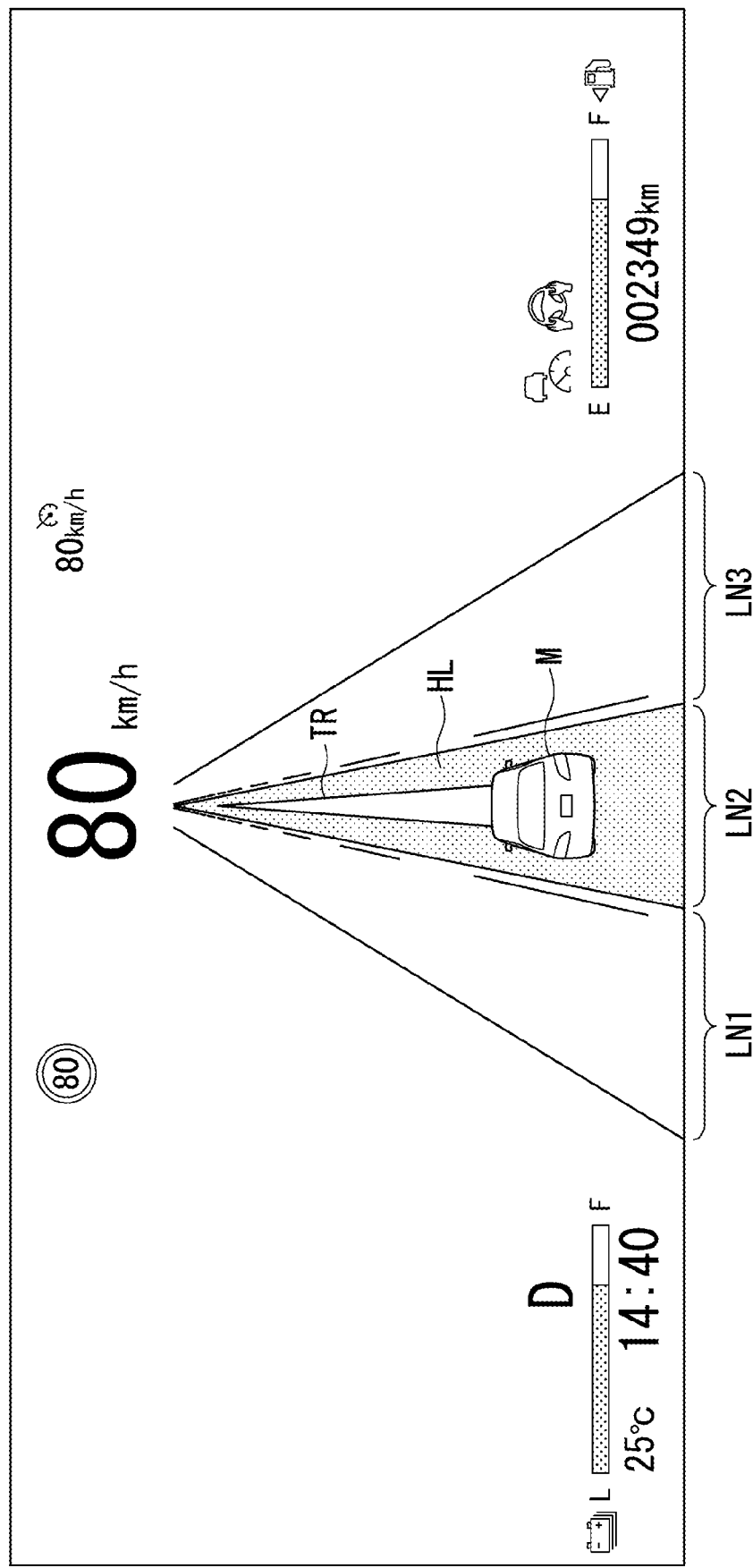
FIG. 8 is a diagram showing an example of a screen of the display device when the driving mode is an automated driving mode.

FIG. 8 is a diagram showing an example of a screen of the display device 32 when the driving mode is the automated driving mode. In the drawing, TR indicates a target trajectory, and HL indicates a home lane. In the example in the drawing, the HMI controller 182 additionally superimposes the second layer image of the home lane HL and the fourth layer image of the target trajectory TR in addition to the first layer image described in FIG. 7 and causes the display device 32 to display it. For example, the home lane HL may be colored in a different color from other lanes.

Figure 9:
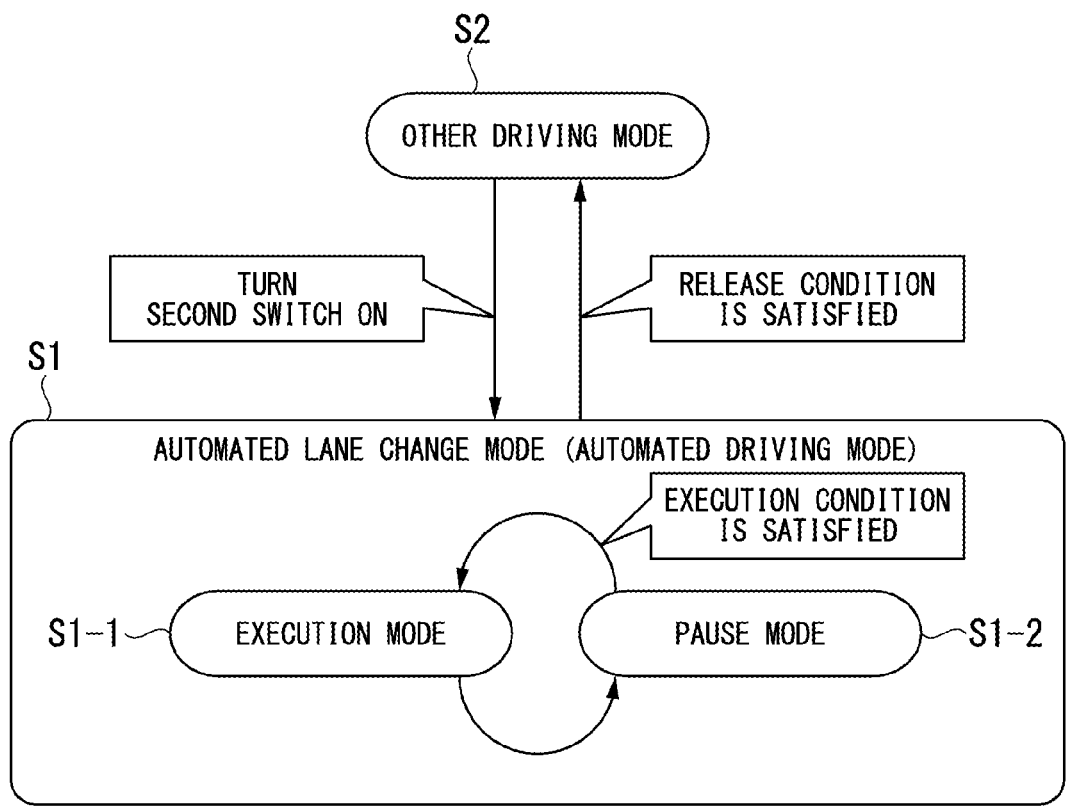
FIG. 9 is a diagram showing an example of a state transition diagram of the driving mode.

FIG. 9 is a diagram showing an example of a state transition diagram of the driving mode. In the drawing, S1 indicates an automated lane change mode which is one of the automated driving modes, and S2 indicates an automated driving mode other than the automated lane change mode S1, that is, an automated driving mode in which at least ALC is prohibited. The other automated driving mode S2 is specifically an automated driving mode in which ACC and LKAS are performed in parallel, and traffic jam pilot (TJP) for controlling the steering and speed of the host vehicle M on a congested road is performed.

A condition for transition from the other automated driving mode S2 to the automated lane change mode S1 is that, as described above, the second switch 34B is operated, and the second switch 34B is turned on. On the other hand, a condition for transition from the automated lane change mode S1 to the other automated driving mode S2 is that a release condition of the automated lane change mode S1 is satisfied.

The release condition includes, for example, at least one of a condition that the second switch 34B has been operated and the second switch 34B is turned off, a condition that the direction indicator has been operated and ALC performed in the automated lane change mode S1 has been canceled, and a condition that the host vehicle M has exited the automated driving permitted section. The release condition is an example of a "second predetermined condition."

The automated lane change mode S1 includes an execution mode S1-1 and a pause mode S1-2. Since performing of ALC is allowed in the execution mode S1-1 and performing of ALC is prohibited in the pause mode S1-2, ALC is temporarily stopped. When an execution condition is satisfied in the pause mode S1-2, the state transitions from the pause mode S1-2 to the execution mode S1-1. The execution mode S1-1 is an example of a "third mode," and the pause mode S1-2 is an example of a "fourth mode." The execution condition is an example of a "first predetermined condition."

The execution conditions include, for example, a condition that there is no merging point or branching point in front of the host vehicle M in the travelling direction, a condition that various sensors are functioning properly and the recognizer 130 can recognize the situation surrounding the host vehicle M, a condition that the speed of the host vehicle M is equal to or larger than a first threshold value (for example, 60 [km/h]) and is less than a second threshold value (for example, 120 [km/h]) larger than the first threshold value, a condition that the curvature of the road is less than a threshold value, a condition that an acceleration (also referred to as a lateral acceleration) generated in the host vehicle M in the vehicle width direction is less than a threshold value, a condition that the lane markings that partition off the host lane are not specific lane markings that prohibit lane change, and a condition that the recognizer 130 can recognize lane markings that partition off the host lane. The execution conditions may include a condition that the target trajectory generator 144 determines that it is possible to change lanes to the adjacent lane based on a TTC with vehicles around the lane change target position TAs.

When the execution conditions including these various conditions are not satisfied, the state transitions from the execution mode S1-1 to the pause mode S1-2. The above various conditions exemplified as execution conditions are only examples, and some of the conditions may be replaced with other conditions, some of the conditions may be omitted, and other conditions may be additionally added.

[Processing Flow]

Figure 10:
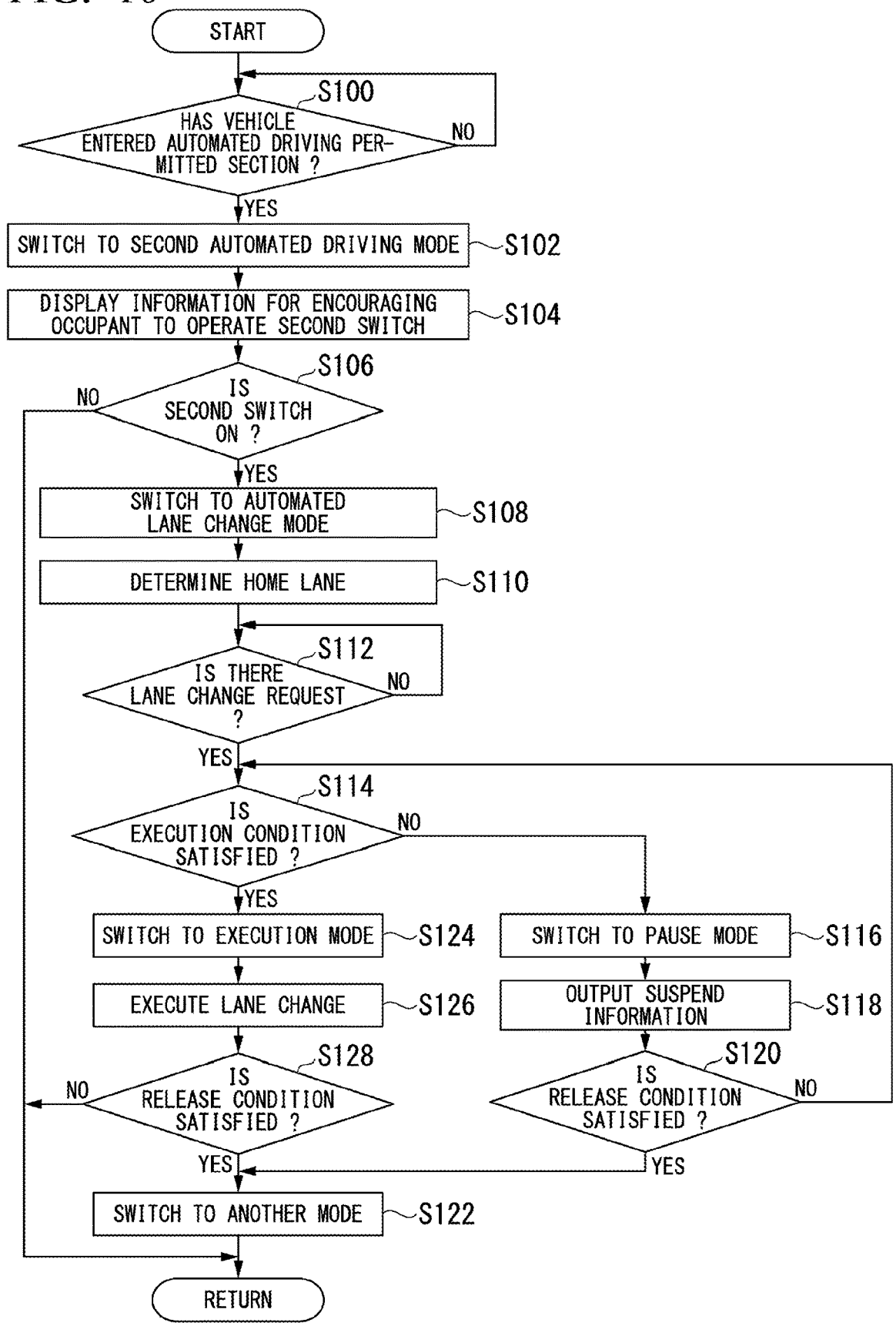
FIG. 10 is a flowchart showing an example of a flow of a series of processes performed by an automated driving control device according to an embodiment.

Hereinafter, a flow of a series of processes performed by the automated driving control device 100 according to the embodiment will be described with reference to a flowchart. FIG. 10 is a flowchart showing an example of a flow of a series of processes performed by the automated driving control device 100 according to the embodiment. For example, the processes of this flowchart may be repeatedly performed at a predetermined cycle when the first switch 34A is operated and the driving mode transitions to the driving assistance mode.

First, the mode controller 178 determines whether the host vehicle M has entered the automated driving permitted section (Step S100).

When the host vehicle M has entered the automated driving permitted section, the mode controller 178 switches the driving mode of the host vehicle M from the driving assistance mode to the second automated driving mode (Step S102).

Next, the HMI controller 182 causes the display device 32 to display information for encouraging the occupant to operate (turn on) the second switch 34B in the second automated driving mode (hereinafter referred to as prompting information) (Step S104).

FIG. 11 is a diagram showing an example of a screen of the display device 32 on which prompting information is displayed. As in the example shown, the HMI controller 182 may cause the display device 32 to display text or an image indicating what kind of function is a function of driving assistance provided by operating the second switch 34B.

As described above, switching to the driving assistance mode is performed by operating the first switch 34A, and switching to the automated lane change mode is performed by operating the second switch 34B that is physically different from the first switch 34A. Therefore, even if the first switch 34A is operated, steering control or speed control of the host vehicle M is allowed under constraint conditions that the host vehicle M does not deviate from the host lane such as ACC and LKAS, and steering control such as crossing a plurality of lanes as in ALC or speed control associated therewith is not allowed unless the second switch 34B is operated.

Among users in the host vehicle M, some users may perform driving assistance with speed control or steering control within the host lane, but they may think that they do not want to perform automated driving with steering control such as moving to another lane. Therefore, in the present embodiment, when one physical switch (including a switch that functions as two switches virtually but is physically one) is operated, instead of switching from the manual driving mode to the automated lane change mode which substantially including the driving assistance mode, the switch is physically separated into a switch that triggers switching to the driving assistance mode and a switch that triggers switching to the automated lane change mode, and switching is gradually performed to the driving mode with a higher degree of control according to the operation of each switch. Thereby, appropriate automated driving (including driving assistance) can be performed according to the user's request.

Next, the mode controller 178 determines whether the second switch 34B is operated (turned on) (Step S106). It is considered that, when the second switch 34B is not operated (not turned on), the mode controller 178 determines that the user does not want a function such as ALC provided in the automated lane change mode, and ends the process of this flowchart.

On the other hand, when the second switch 34B is operated (turned on), the mode controller 178 switches the driving mode to the automated lane change mode (Step S108). In the automated lane change mode switched at the timing of the process of S108, the first duty is imposed.

Next, the home lane determiner 180 determines a lane recognized as a host lane by the recognizer 130 among one or a plurality of lanes recognized by the recognizer 130 when the driving mode is switched to the automated lane change mode as the home lane (Step S110).

For example, when the second switch 34B is operated after the host vehicle M has entered the automated driving permitted section, the home lane determiner 180 determines a lane recognized as a host lane by the recognizer 130 when the second switch 34B is operated as the home lane.

Figure 12:
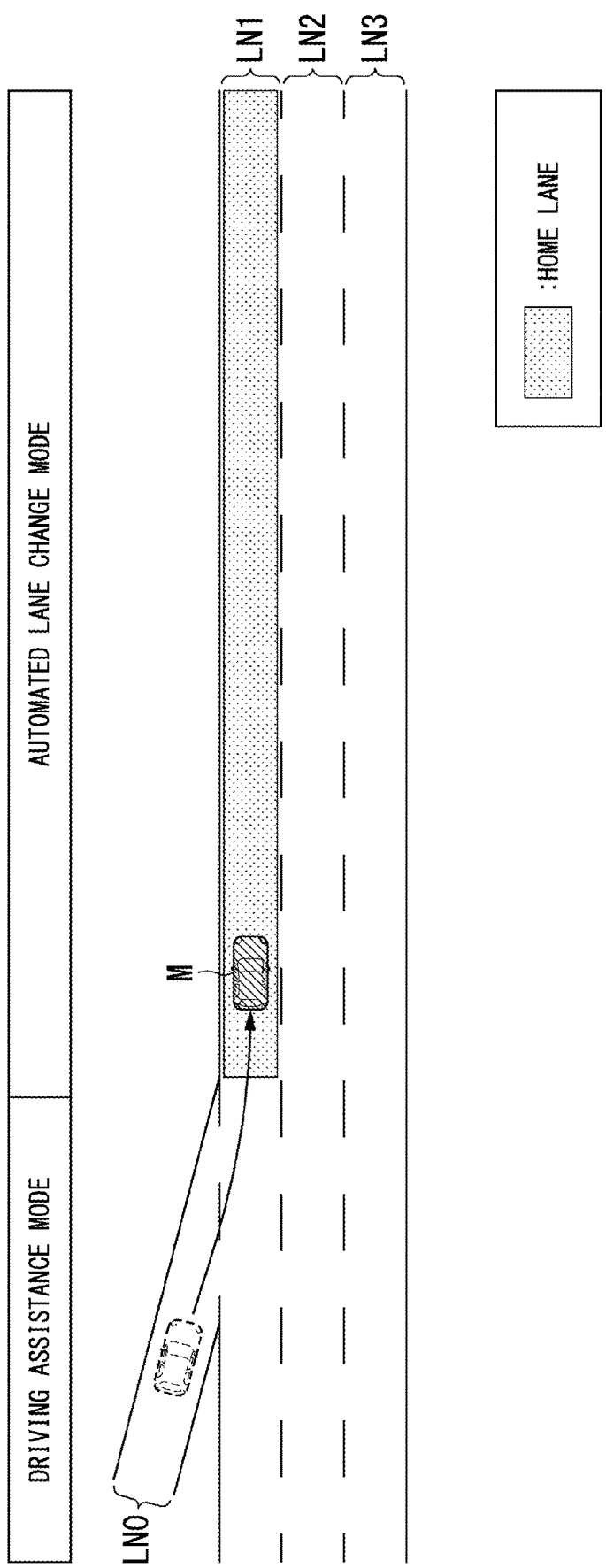
FIG. 12 is a diagram showing an example of a scenario in which the host vehicle is traveling a branch line that merges onto a highway.

FIG. 12 is a diagram showing an example of a scenario in which the host vehicle M is traveling in a branch line that merges onto a highway. In the drawing, LN0 indicates a branch line that merges onto the highway (hereinafter referred to as a merging lane), and LN1 to LN3 indicate lanes included in the highway as a main route. Among the lanes LN1 to LN3, the lane LN3 indicates a passing lane, the lane LN1 farthest from the passing lane LN3 indicates a first traveling lane, and the lane between the passing lane LN3 and the first traveling lane LN1 indicates a second traveling lane. The first traveling lane LN1 is also called a slow lane and is a lane in which the speed of vehicles that pass is the slowest.

For example, while the host vehicle M travels on the merging lane LN0, the mode controller 178 determines the driving mode as the driving assistance mode. In this case, in principle, the occupant causes the host vehicle M to merge into the first traveling lane LN1 by manual driving. When the host vehicle M changes lanes from the merging lane LN0 to the first traveling lane LN1, the mode controller 178 switches the driving mode from the driving assistance mode to the second automated driving mode. In response to this, the HMI controller 182 causes the display device 32 to display prompting information for encouraging the occupant to operate (turn on) the second switch 34B. In the shown example, since the occupant quickly operates the second switch 34B, the host vehicle M transitions from the driving mode to the automated lane change mode at substantially the same timing at which it enters the highway.

The description will return to the flowchart in FIG. 10. Next, the mode controller 178 determines whether there is a lane change request (Step S112). The mode controller 178 is an example of a "determiner."

Figure 13:
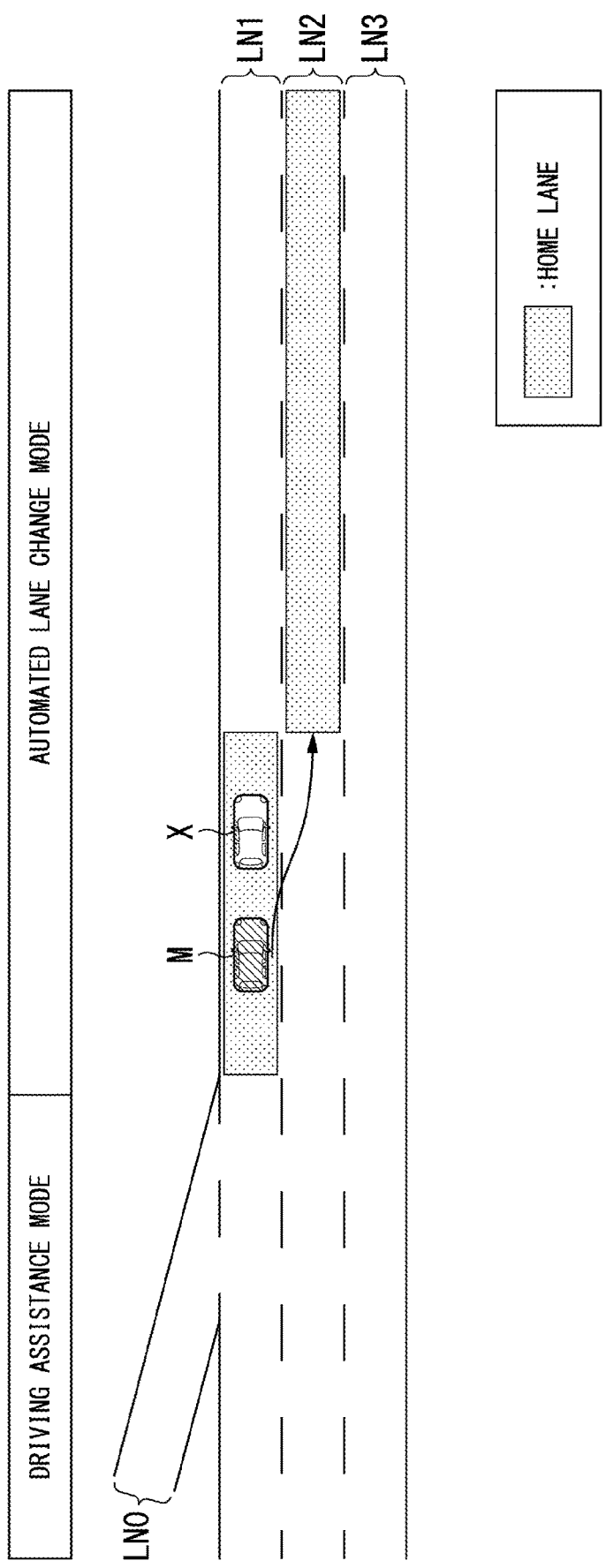
FIG. 13 is a diagram showing an example of a scenario in which a lane change request occurs.

FIG. 13 is a diagram showing an example of a scenario in which a lane change request occurs. In the illustrated scenario, the preceding vehicle X is present in front of the host vehicle M that is traveling in the first traveling lane LN1. The preceding vehicle X has a speed lower than the host vehicle M and a relative speed with respect to the host vehicle M, which is equal to or larger than a threshold value.

In such a scenario, the action plan generator 140 plans a passing event which is a type of lane change event, and determines that the host vehicle M will be caused to change lanes to an adjacent second traveling lane LN2. In response to this, the mode controller 178 determines that there is a lane change request. In this case, the home lane determiner 180 changes the home lane from the first traveling lane LN1 to the second traveling lane LN2.

When it is determined that there is a lane change request, the mode controller 178 additionally determines whether an execution condition is satisfied (Step S114). When it is determined that an execution condition is not satisfied, the mode controller 178 switches the driving mode to the pause mode (Step S116).

Next, the HMI controller 182 causes the display device 32 to display information indicating that the driving mode is the pause mode, and ALC is temporarily stopped (hereinafter referred to as suspend information) as an image, or a speaker is used to output the information as sound (Step S118).

Figure 14:
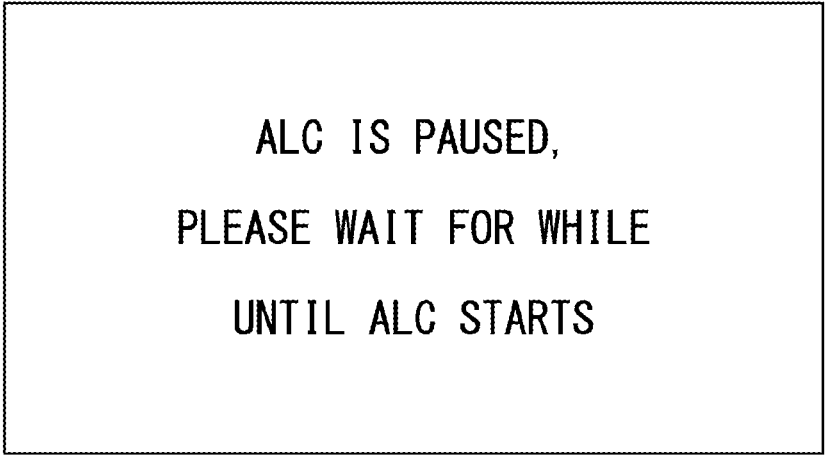
FIG. 14 is a diagram showing an example of a screen of the display device on which suspend information is displayed.

FIG. 14 is a diagram showing an example of a screen of the display device 32 on which suspend information is displayed. As in the example shown, text or an image indicating that ALC is temporarily stopped is displayed as suspend information on the screen of the display device 32.

The description will return to the flowchart in FIG. 10. Next, the mode controller 178 determines whether a release condition of an automated lane change mode is satisfied (Step S120).

Figure 15:
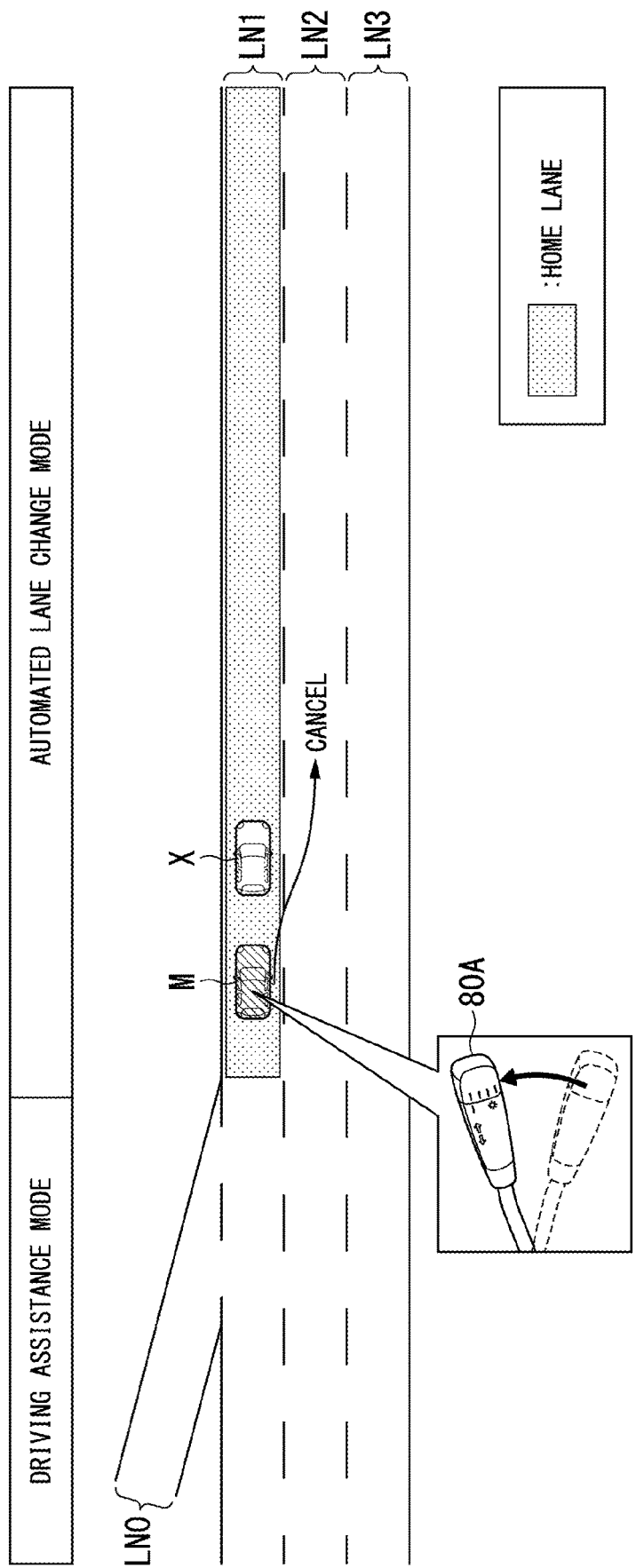
FIG. 15 is a diagram showing an example of a scenario in which a release condition of an automated lane change mode is satisfied.

FIG. 15 is a diagram showing an example of a scenario in which a release condition of an automated lane change mode is satisfied. In the drawing, 80A indicates the lever of the direction indicator. The illustrated scenario shows that, in order to pass the preceding vehicle X, the host vehicle M changes lanes to the second traveling lane LN2. In such a scenario, for example, when the occupant operates the lever 80A of the direction indicator or the steering wheel and instructs the vehicle to change lanes to an adjacent lane on the left side at a timing when the host vehicle M starts moving toward the second traveling lane LN, the action plan generator 140 changes the passing event in which the host vehicle M is caused to change lanes to the second traveling lane LN2 to another event such as a following traveling event. Thereby, the lane change to the second traveling lane LN2 by the host vehicle M is canceled. Therefore, the mode controller 178 determines that a release condition of an automated lane change mode is satisfied. In this case, the home lane determiner 180 continuously determines the first traveling lane LN1 as the home lane according to an instruction of the occupant without changing the home lane from the first traveling lane LN1 to the second traveling lane LN2.

Figure 16:
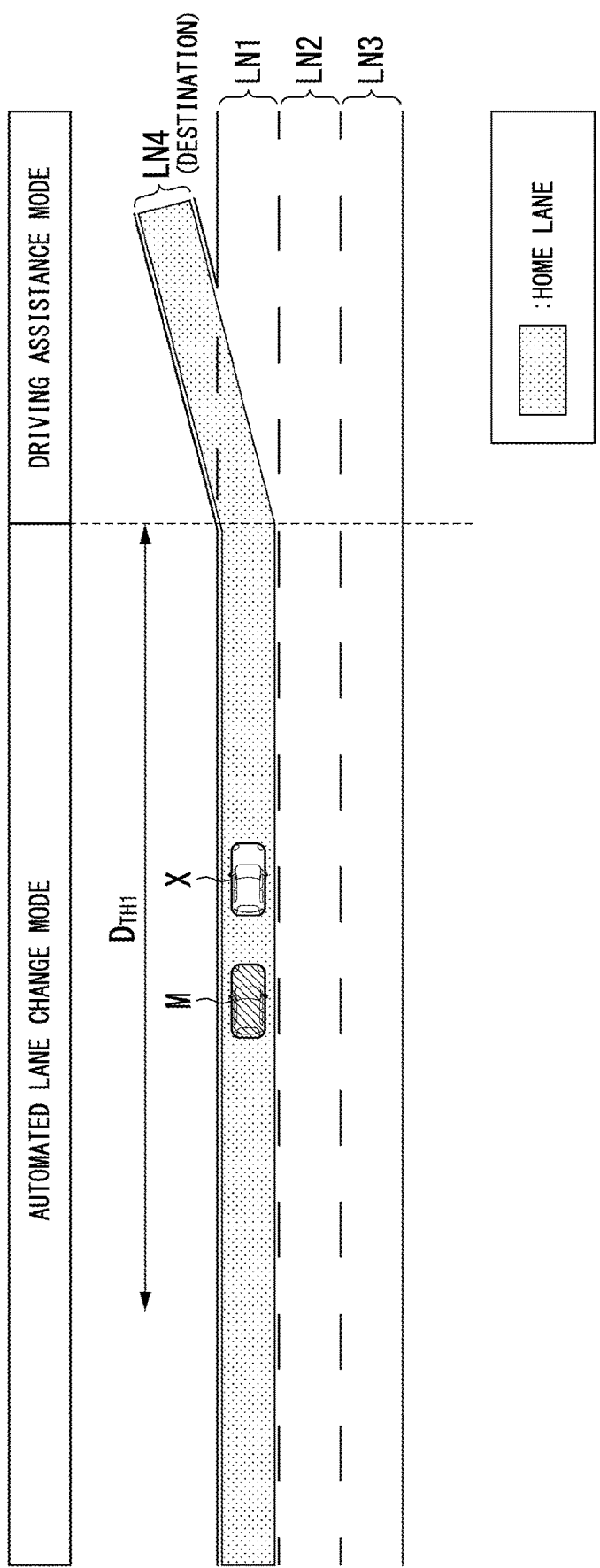
FIG. 16 is a diagram showing another example of the scenario in which a release condition of an automated lane change mode is satisfied.

FIG. 16 is a diagram showing another example of the scenario in which a release condition of an automated lane change mode is satisfied. In the drawing, LN4 indicates a branch line branching from a highway (hereinafter referred to as a branch lane). In the shown example, the branch lane LN4 is connected to the first traveling lane LN1 among lanes LN1 to LN3 as the main lines, and additionally, a destination of the host vehicle M is present on the side of the branch lane LN4. The destination is, for example, a facility that faces a general road. In this case, the branch lane LN4 is a rampway that connects the highway and the general road, and the end of the branch lane LN4 is a section in which some or all of functions of automated driving are restricted (hereinafter referred to as an automated driving restricted section).

For example, in a partial section the first predetermined distance $D_{TH1}$ before the branching point when viewed from the host vehicle M, when the host vehicle M is traveling in the second traveling lane LN2 or the passing lane LN3 instead of the first traveling lane LN1 connected to the branch lane LN4, the vehicle disturbs other nearby vehicles, is not able to change lanes to the first traveling lane LN1 before the branching point, and can pass through the branching point without exiting the automated driving permitted section. Therefore, when exiting the automated driving permitted section at the branching point, if the host vehicle M enters a partial section the first predetermined distance $D_{TH1}$ before the branching point, the mode controller 178 determines that a release condition of an automated lane change mode is satisfied. Thereby, in this section, ALC from the first traveling lane LN1 to another lane is not allowed, and the vehicle can smoothly move to the branch lane LN4 at the branching point.

When it is determined that a release condition of an automated lane change mode is not satisfied, the mode controller 178 returns the process to S112. Thereby, the pause mode is maintained until the execution condition is satisfied after the second switch 34B is operated.

On the other hand, when it is determined that a release condition of an automated lane change mode is satisfied, the mode controller 178 switches the driving mode from the automated lane change mode to another automated driving mode (Step S122). Thereby, there is a lane change request and the temporarily stopped (restricted) ALC is completely stopped.

On the other hand, when it is determined that an execution condition is satisfied, the mode controller 178 switches the driving mode to the execution mode (Step S124).

Next, the automated driving control device 100 causes the host vehicle M to change lanes (Step S126). Specifically, the target trajectory generator 144 of the action plan generator 140 generates a target trajectory from the main line to the branch lane, and generates a target trajectory from the merging lane to the main line. In response to this, the second controller 160 controls the traveling driving force output device 200, the brake system 210, and the steering device 220 based on the target trajectory generated by the target trajectory generator 144, and causes the host vehicle M to change lanes to a target lane according to automated driving.

Next, the mode controller 178 determines whether a release condition of an automated lane change mode is satisfied (Step S128). For example, in the execution mode, when the occupant activates the direction indicator and cancels the lane change, the mode controller 178 determines that a release condition of an automated lane change mode is satisfied.

When it is determined that a release condition of an automated lane change mode is satisfied, the mode controller 178 advances the process to S122, and switches the driving mode from the automated lane change mode to another automated driving mode. Thereby, ALC performed in response to the lane change request is interrupted.

According to the embodiment described above, when the first switch 34A is operated, the automated driving control device 100 determines the driving mode of the host vehicle M as the second automated driving mode in which ALC is not performed, and when the second switch 34B in the second automated driving mode is operated, the automated driving control device 100 switches the driving mode from the second automated driving mode in which ALC is not performed to the second automated driving mode in which ALC is performed, that is, the automated lane change mode. When the driving mode is the second automated driving mode in which ALC is not performed, the automated driving control device 100 performs ACC and LKAS in a parallel manner and performs TJP. On the other hand, when the driving mode is the automated lane change mode, the automated driving control device 100 can additionally perform ALC in addition to ACC, LKAS, and TJP. In this manner, the occupant is requested to perform a two-step switch operation until ALC becomes possible. Therefore, even if a user who does not want to perform ALC under automated driving is in the host vehicle M, it is possible to perform appropriate automated driving for the occupant.

According to the above embodiment, the execution mode and the pause mode are provided in the automated lane change mode in which ALC is performed, and the state is changed between these two modes according to the surrounding situation of the host vehicle M. Thereby, for example, even if ALC cannot be performed currently, and the driving mode is switched to the pause mode, if ALC can be performed at a certain time in the future, the driving mode can be switched to the execution mode, and the temporarily stopped ALC can be performed.

According to the above embodiment, the occupant is notified of the fact that ALC is temporarily stopped in the pause mode. Thereby, for example, as a result of calculation based on the TTC with other vehicles therearound, even if ALC is stopped although this cannot (easily) be directly visually confirmed by the occupant, for example, because there is not enough space to change lanes to an adjacent lane, because there is a merging point or branching point in front of the host vehicle M in the travelling direction on the map although this is difficult to visually confirm, or because various sensors are not functioning properly and the recognizer 130 cannot recognize the surrounding situation of the host vehicle M, the occupant can be informed of the fact that ALC is not being performed for a certain reason.

Modified Examples of Embodiment

While a case in which, in the execution mode S1-1, path change associated with lane change such as ACC is allowed has been described in the above embodiment, the present invention is not limited thereto. For example, in the execution mode S1-1, control to change the path of the host vehicle M according to turning right or left at an intersection, control to change the path to a right-turn lane or the like, and control to change the path toward a desired gate in front of a tollgate (for example, electronic toll collection system (ETC) gate) may be allowed.

[Hardware Configuration]

Figure 17:
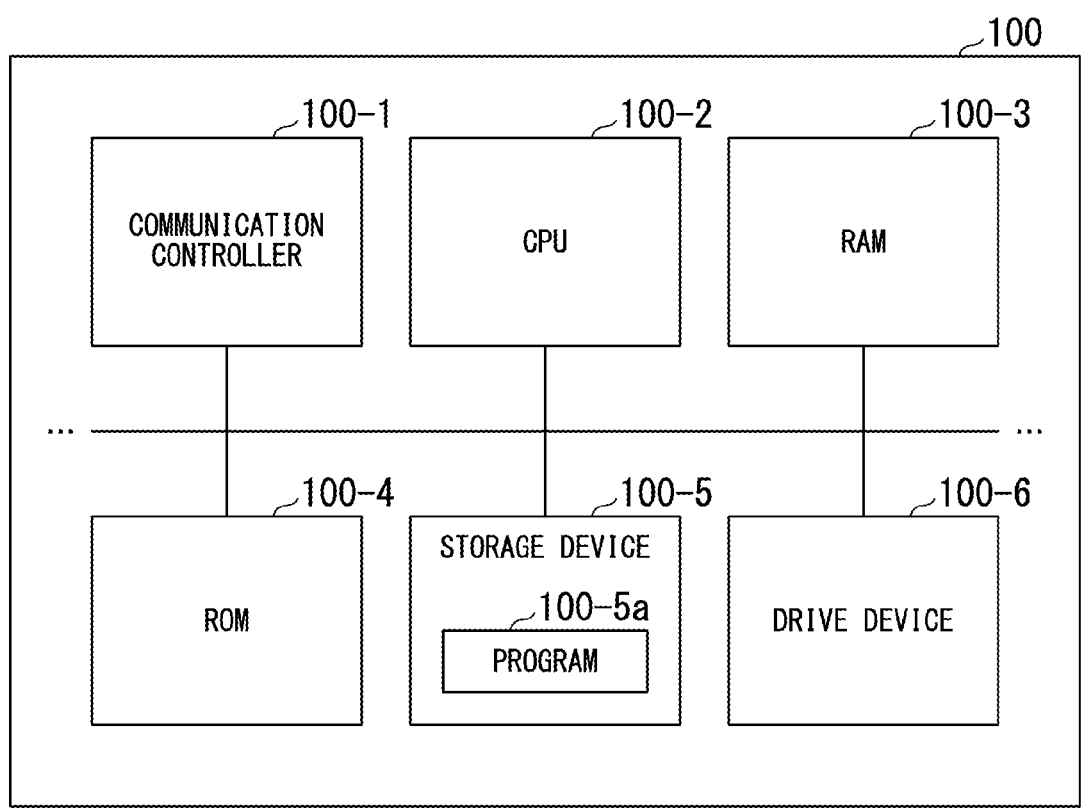
FIG. 17 is a diagram showing an example of a hardware configuration of an automated driving control device according to an embodiment.

FIG. 17 is a diagram showing an example of a hardware configuration of the automated driving control device 100 according to the embodiment. As illustrated, the automated driving control device 100 has a configuration including a communication controller 100-1, a CPU 100-2, a RAM 100-3 used as a working memory, a ROM 100-4 in which a boot program and the like are stored, a storage device 100-5 such as a flash memory and a HDD, a drive device 100-6, and the like which are connected to each other via an internal bus or a dedicated communication line. The communication controller 100-1 communicates with components other than the automated driving control device 100. In the storage device 100-5, a program 100-5a that the CPU 100-2 executes is stored. This program is loaded into the RAM 100-3 by a direct memory access (DMA) controller (not shown) or the like and executed by the CPU 100-2. Thereby, some or all of the first controller 120, the second controller 160, and the third controller 170 are realized.

The embodiment described above can be expressed as follows.

A vehicle control device includes
a first inputter that is operable by a user;
a second inputter that is operable by the user;
a storage in which a program is stored; and
a processor,
wherein the processor causes the program to execute:
determining a driving mode of a vehicle as a first mode when the first inputter is operated;
switching the driving mode from the first mode to a second mode when the second inputter is operated in the first mode;
controlling at least one of a steering and speed of the vehicle;
controlling a steering and speed of the vehicle and prohibiting change of the path of the vehicle when the driving mode is the first mode; and
controlling a steering and speed of the vehicle and allowing change of the path of the vehicle when the driving mode is the second mode.

While forms for implementing the present invention have been described above with reference to embodiments, the present invention is not limited to the embodiments at all, and various modifications and substitutions can be made without departing from the spirit and scope of the present invention.

What is claimed is:

1. A vehicle control device, comprising:
a first input device that is operable by a user;
a second input device that is operable by the user;
a third input device that is operable by the user; and
a processor configured to:
when the first input device is operated, determine a driving mode of a vehicle as a first mode, and when the second input device is operated in the first mode, switch the driving mode from the first mode to a second mode;
control at least one of a steering and speed of the vehicle; and
determine whether it is necessary to change a path of the vehicle according to a surrounding situation of the vehicle,
wherein the processor is configured to control the steering and speed of the vehicle and prohibit change of the path of the vehicle when the driving mode is the first mode, and control the steering and speed of the vehicle and change of the path of the vehicle is allowed when the driving mode is the second mode,
wherein the second mode includes a third mode and a fourth mode,
wherein, when a first predetermined condition is satisfied after the second input device is operated in the first mode, the processor is configured to determine the driving mode as the third mode, and until the first predetermined condition is satisfied from when the second input device is operated in the first mode, the processor is configured to determine the driving mode as the fourth mode,
wherein the processor is configured to allow change of the path of the vehicle when an instruction is input to the third input device or the processor determines that it is necessary to change the path in the third mode,
wherein the processor is configured to prohibit change of the path of the vehicle in the fourth mode,
wherein, when a second predetermined condition is satisfied earlier than the first predetermined condition is satisfied after the driving mode is determined as the fourth mode, the processor is configured to determine the driving mode as the first mode,
wherein the second predetermined condition includes a condition that the vehicle exits a section in which the automated driving is allowed.

2. The vehicle control device according to claim 1, wherein the second input device receives an input operation of the user when the driving mode is a mode in which a duty to grip at least a steering handler is not imposed on the user, and does not receive an input operation of the user when the driving mode is a mode in which the duty is imposed on the user.

3. The vehicle control device according to claim 1, further comprising:
an output device configured to output information; and
the processor is configured to cause the output device to output information indicating that control to change the path of the vehicle is in a restricted state when the driving mode is the fourth mode.

4. The vehicle control device according to claim 1, wherein the second predetermined condition further includes
a condition that the second input device is operated, and
a condition that a direction indicator is operated.

5. A vehicle control method implemented by a computer mounted in a vehicle, the vehicle including a first input device that is operable by a user, a second input device that is operable by the user, and a third input device that is operable by the user, the vehicle control method comprising:
determining a driving mode of the vehicle as a first mode when the first input device is operated;
switching the driving mode from the first mode to a second mode when the second input device is operated in the first mode;
controlling at least one of a steering and speed of the vehicle;
controlling the steering and speed of the vehicle and prohibiting change of a path of the vehicle when the driving mode is the first mode;
controlling the steering and speed of the vehicle and allowing change of the path of the vehicle when the driving mode is the second mode; and
determining whether it is necessary to change the path of the vehicle according to a surrounding situation of the vehicle,
wherein the second mode includes a third mode and a fourth mode,
wherein the vehicle control method further comprising the computer to perform:
when a first predetermined condition is satisfied after the second input device is operated in the first mode, determining the driving mode as the third mode;
until the first predetermined condition is satisfied from when the second input device is operated in the first mode, determining the driving mode as the fourth mode;
allowing change of the path of the vehicle when an instruction is input to the third input device or when it is determined that it is necessary to change the path in the third mode; and
prohibiting change of the path of the vehicle in the fourth mode;
wherein, when a second predetermined condition is satisfied earlier than the first predetermined condition is satisfied after the driving mode is determined as the fourth mode, determining the driving mode as the first mode; and wherein the second predetermined condition includes a condition that the vehicle exits a section in which the automated driving is allowed.

6. A non-transitory computer readable storage medium storing a program executed by a computer mounted in a vehicle, the vehicle including a first input device that is operable by a user, a second input device that is operable by the user, and a third input device that is operable by the user, the program, when executed by the computer, causes the computer to perform:
  determining a driving mode of the vehicle as a first mode when the first input device is operated;
  switching the driving mode from the first mode to a second mode when the second input device is operated in the first mode;
  controlling at least one of a steering and speed of the vehicle;
  controlling the steering and speed of the vehicle and prohibiting change of a path of the vehicle when the driving mode is the first mode;
  controlling the steering and speed of the vehicle and allowing change of the path of the vehicle when the driving mode is the second mode; and
  determining whether it is necessary to change the path of the vehicle according to a surrounding situation of the vehicle,
wherein the second mode includes a third mode and a fourth mode,
wherein the program when executed by the computer, further causes the computer to perform:
  when a first predetermined condition is satisfied after the second input device is operated in the first mode, determining the driving mode as the third mode;
  until the first predetermined condition is satisfied from when the second input device is operated in the first mode, determining the driving mode as the fourth mode;
  allowing change of the path of the vehicle when an instruction is input to the third input device or when it is determined that it is necessary to change the path in the third mode; and
  prohibiting change of the path of the vehicle in the fourth mode;
  wherein, when a second predetermined condition is satisfied earlier than the first predetermined condition is satisfied after the driving mode is determined as the fourth mode, determining the driving mode as the first mode; and
  wherein the second predetermined condition includes a condition that the vehicle exits a section in which automated driving is allowed.

* * * * *